United States Patent
Song et al.

(10) Patent No.: US 11,829,614 B2
(45) Date of Patent: Nov. 28, 2023

(54) SEMICONDUCTOR MEMORY DEVICES AND METHODS OF OPERATING SEMICONDUCTOR MEMORY DEVICES

(71) Applicant: Samsung Electronics Co., Ltd., Suwon-si (KR)

(72) Inventors: Yeonggeol Song, Seoul (KR); Sungrae Kim, Hwaseong-si (KR); Kijun Lee, Seoul (KR); Myungkyu Lee, Seoul (KR); Eunae Lee, Hwaseong-si (KR); Sunghye Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/842,981

(22) Filed: Jun. 17, 2022

(65) Prior Publication Data

US 2023/0168819 A1 Jun. 1, 2023

(30) Foreign Application Priority Data

Nov. 30, 2021 (KR) .................. 10-2021-0168234

(51) Int. Cl.
*G06F 3/06* (2006.01)
*G06F 11/10* (2006.01)

(52) U.S. Cl.
CPC ............ *G06F 3/0626* (2013.01); *G06F 3/064* (2013.01); *G06F 3/0679* (2013.01); *G06F 11/1068* (2013.01)

(58) Field of Classification Search
CPC ...... G06F 3/0626; G06F 3/064; G06F 3/0679; G06F 11/1068; G06F 3/0619;

(Continued)

(56) References Cited

U.S. PATENT DOCUMENTS 3,755,779 A * 8/1973 Price ................... G06F 11/1028
714/E11.046
5,099,484 A 3/1992 Smelser
(Continued)

FOREIGN PATENT DOCUMENTS

KR 100851974 B1 8/2008

OTHER PUBLICATIONS

S. Pontarelli, et al., "Low Delay Single Symbol Error Correction Codes Based on Reed Solomon Codes," IEEE Transactions on Computers, May 1, 2015, pp. 1497-1501, vol. 64, No. 5.

*Primary Examiner* — Sean D Rossiter
(74) *Attorney, Agent, or Firm* — Muir Patent Law, PLLC

(57) ABSTRACT

A semiconductor memory device includes a buffer die and a plurality of memory dies. An error correction code (ECC) engine in one of the memory dies performs an RS encoding on a main data to generate a parity data and performs a RS decoding, using a parity check matrix, on the main data and the parity data. The parity check matrix includes sub matrixes and each of the sub matrixes corresponds to two different symbols. Each of the sub matrixes includes two identity sub matrixes and two same alpha matrixes, the two identity sub matrixes are disposed in a first diagonal direction of the sub matrix and the two same alpha matrixes are disposed in a second diagonal direction. A number of high-level value elements in a y-th row of the parity check matrix is the same as a number of high-level value elements in a (y+p)-th row.

20 Claims, 25 Drawing Sheets

(58) Field of Classification Search
CPC .. G06F 3/065; G06F 11/1012; G06F 11/1048;
G06F 17/16; G11C 29/42; G11C 5/06;
G11C 11/401
See application file for complete search history.

(56) References Cited

U.S. PATENT DOCUMENTS

| | | |
|---|---|---|
| 7,487,425 B1 | 2/2009 | Chen |
| 7,930,622 B2 | 4/2011 | Oh et al. |
| 9,047,929 B2 | 6/2015 | Seo et al. |
| 10,162,703 B2 | 12/2018 | Kim |
| 10,937,453 B1 * | 3/2021 | Butt ................. G06F 3/067 |
| 10,944,427 B2 | 3/2021 | Ma et al. |
| 2007/0162821 A1 | 7/2007 | Hwang et al. |
| 2013/0297993 A1 * | 11/2013 | Murakami ............ H03M 13/23 |
| | | 714/786 |
| 2014/0075267 A1 * | 3/2014 | Koji .................. G06F 11/0727 |
| | | 708/492 |
| 2021/0194508 A1 * | 6/2021 | Kim .................. G06F 11/1048 |

* cited by examiner

FIG. 12

ISM1

$$\begin{matrix}1&0&0&0&0&0&0&0\\0&1&0&0&0&0&0&0\\0&0&1&0&0&0&0&0\\0&0&0&1&0&0&0&0\\0&0&0&0&1&0&0&0\\0&0&0&0&0&1&0&0\\0&0&0&0&0&0&1&0\\0&0&0&0&0&0&0&1\end{matrix}$$

p × p

ZSM1

$$\begin{matrix}0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\end{matrix}$$

$\alpha^{i(\frac{k}{2}-1)}$ $$\begin{matrix}0&0&0&0&0&0&0&1\\1&0&0&0&0&0&0&1\\0&1&0&0&0&0&0&1\\0&0&1&0&0&0&0&0\\0&0&0&1&0&0&0&0\\0&0&0&0&1&0&0&0\\0&0&0&0&0&1&0&0\\0&0&0&0&0&0&1&1\end{matrix}$$

SMT($\frac{k}{2}$-1)

| | |
|---|---|
| 511 — [ 1 0 0 0 0 0 0 0 | 0 0 0 0 0 0 0 1 ] |
| 0 1 0 0 0 0 0 0 | 1 0 0 0 0 0 0 1 |
| 0 0 1 0 0 0 0 0 | 0 1 0 0 0 0 0 1 |
| 0 0 0 1 0 0 0 0 | 0 0 1 0 0 0 0 0 |
| 0 0 0 0 1 0 0 0 | 0 0 0 1 0 0 0 0 |
| 0 0 0 0 0 1 0 0 | 0 0 0 0 1 0 0 0 |
| 0 0 0 0 0 0 1 0 | 0 0 0 0 0 1 0 0 |
| 0 0 0 0 0 0 0 1 | 0 0 0 0 0 0 1 1 |
| 513 — [ 0 0 0 0 0 0 0 1 | 1 0 0 0 0 0 0 0 ] |
| 1 0 0 0 0 0 0 1 | 0 1 0 0 0 0 0 0 |
| 0 1 0 0 0 0 0 1 | 0 0 1 0 0 0 0 0 |
| 0 0 1 0 0 0 0 0 | 0 0 0 1 0 0 0 0 |
| 0 0 0 1 0 0 0 0 | 0 0 0 0 1 0 0 0 |
| 0 0 0 0 1 0 0 0 | 0 0 0 0 0 1 0 0 |
| 0 0 0 0 0 1 0 0 | 0 0 0 0 0 0 1 0 |
| 0 0 0 0 0 0 1 1 | 0 0 0 0 0 0 0 1 |

ISM2

$$\begin{pmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 0 & 1 \end{pmatrix}$$

$$\alpha^{i(\frac{k}{2}-1)'}$$

$$p\begin{pmatrix} 0 & 0 & 0 & 0 & 0 & 0 & 0 & 0 & 0 & 0 & 0 & 0 & 0 & 0 & 0 & 1 \\ 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 1 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 1 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 1 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 1 & 0 \end{pmatrix}$$

$\longleftarrow p \longrightarrow$

ZSM2

SDR = H · C$^T$

C = | SBL0 | SBL1 | ... | SBL$^{(k-1)}$ | PRT |

FIG. 19

$\underline{SMT(\frac{k}{2}-1)}$

| | |
|---|---|
| 521 — 1 0 0 0 0 0 0 0 0 0 0 0 0 0 0 0 | 0 0 0 0 0 0 0 0 0 0 0 0 0 0 0 1 |
| 0 1 0 0 0 0 0 0 0 0 0 0 0 0 0 0 | 1 0 0 0 0 0 0 0 0 0 0 0 0 0 0 0 |
| 0 0 1 0 0 0 0 0 0 0 0 0 0 0 0 0 | 0 1 0 0 0 0 0 0 0 0 0 0 0 0 0 0 |
| 0 0 0 1 0 0 0 0 0 0 0 0 0 0 0 0 | 0 0 1 0 0 0 0 0 0 0 0 0 0 0 0 1 |
| 0 0 0 0 1 0 0 0 0 0 0 0 0 0 0 0 | 0 0 0 1 0 0 0 0 0 0 0 0 0 0 0 0 |
| 0 0 0 0 0 1 0 0 0 0 0 0 0 0 0 0 | 0 0 0 0 1 0 0 0 0 0 0 0 0 0 0 0 |
| 0 0 0 0 0 0 1 0 0 0 0 0 0 0 0 0 | 0 0 0 0 0 1 0 0 0 0 0 0 0 0 0 0 |
| 0 0 0 0 0 0 0 1 0 0 0 0 0 0 0 0 | 0 0 0 0 0 0 1 0 0 0 0 0 0 0 0 1 |
| 0 0 0 0 0 0 0 0 1 0 0 0 0 0 0 0 | 0 0 0 0 0 0 0 1 0 0 0 0 0 0 0 0 |
| 0 0 0 0 0 0 0 0 0 1 0 0 0 0 0 0 | 0 0 0 0 0 0 0 0 1 0 0 0 0 0 0 0 |
| 0 0 0 0 0 0 0 0 0 0 1 0 0 0 0 0 | 0 0 0 0 0 0 0 0 0 1 0 0 0 0 0 1 |
| 0 0 0 0 0 0 0 0 0 0 0 1 0 0 0 0 | 0 0 0 0 0 0 0 0 0 0 1 0 0 0 0 0 |
| 0 0 0 0 0 0 0 0 0 0 0 0 1 0 0 0 | 0 0 0 0 0 0 0 0 0 0 0 1 0 0 0 0 |
| 0 0 0 0 0 0 0 0 0 0 0 0 0 1 0 0 | 0 0 0 0 0 0 0 0 0 0 0 0 1 0 0 0 |
| 0 0 0 0 0 0 0 0 0 0 0 0 0 0 1 0 | 0 0 0 0 0 0 0 0 0 0 0 0 0 1 0 0 |
| 0 0 0 0 0 0 0 0 0 0 0 0 0 0 0 1 | 0 0 0 0 0 0 0 0 0 0 0 0 0 0 1 0 |
| 523 — 0 0 0 0 0 0 0 0 0 0 0 0 0 0 0 1 | 1 0 0 0 0 0 0 0 0 0 0 0 0 0 0 0 |
| 1 0 0 0 0 0 0 0 0 0 0 0 0 0 0 0 | 0 1 0 0 0 0 0 0 0 0 0 0 0 0 0 0 |
| 0 1 0 0 0 0 0 0 0 0 0 0 0 0 0 0 | 0 0 1 0 0 0 0 0 0 0 0 0 0 0 0 0 |
| 0 0 1 0 0 0 0 0 0 0 0 0 0 0 0 1 | 0 0 0 1 0 0 0 0 0 0 0 0 0 0 0 0 |
| 0 0 0 1 0 0 0 0 0 0 0 0 0 0 0 0 | 0 0 0 0 1 0 0 0 0 0 0 0 0 0 0 0 |
| 0 0 0 0 1 0 0 0 0 0 0 0 0 0 0 0 | 0 0 0 0 0 1 0 0 0 0 0 0 0 0 0 0 |
| 0 0 0 0 0 1 0 0 0 0 0 0 0 0 0 0 | 0 0 0 0 0 0 1 0 0 0 0 0 0 0 0 0 |
| 0 0 0 0 0 0 1 0 0 0 0 0 0 0 0 1 | 0 0 0 0 0 0 0 1 0 0 0 0 0 0 0 0 |
| 0 0 0 0 0 0 0 1 0 0 0 0 0 0 0 0 | 0 0 0 0 0 0 0 0 1 0 0 0 0 0 0 0 |
| 0 0 0 0 0 0 0 0 1 0 0 0 0 0 0 0 | 0 0 0 0 0 0 0 0 0 1 0 0 0 0 0 0 |
| 0 0 0 0 0 0 0 0 0 1 0 0 0 0 0 1 | 0 0 0 0 0 0 0 0 0 0 1 0 0 0 0 0 |
| 0 0 0 0 0 0 0 0 0 0 1 0 0 0 0 0 | 0 0 0 0 0 0 0 0 0 0 0 1 0 0 0 0 |
| 0 0 0 0 0 0 0 0 0 0 0 1 0 0 0 0 | 0 0 0 0 0 0 0 0 0 0 0 0 1 0 0 0 |
| 0 0 0 0 0 0 0 0 0 0 0 0 1 0 0 0 | 0 0 0 0 0 0 0 0 0 0 0 0 0 1 0 0 |
| 0 0 0 0 0 0 0 0 0 0 0 0 0 1 0 0 | 0 0 0 0 0 0 0 0 0 0 0 0 0 0 1 0 |
| 0 0 0 0 0 0 0 0 0 0 0 0 0 0 1 0 | 0 0 0 0 0 0 0 0 0 0 0 0 0 0 0 1 |

$SDR\_M = HS_{11} \times C^T$ $SDR\_L = HS_{12} \times C^T$

FIG. 21

SDR = 00000000000000001 | 100100001001000000

SDR_M, SDR_L

SEMICONDUCTOR MEMORY DEVICES AND METHODS OF OPERATING SEMICONDUCTOR MEMORY DEVICES

CROSS-REFERENCE TO RELATED APPLICATION

This application claims priority under 35 USC § 119 to Korean Patent Application No. 10-2021-0168234, filed on Nov. 30, 2021, in the Korean Intellectual Property Office (KIPO), the disclosure of which is incorporated in its entirety by reference herein.

BACKGROUND

1. Technical Field

Example embodiments relate to memories, and more particularly to semiconductor memory devices capable of enhancing performance and methods of operating semiconductor memory devices.

2. Discussion of the Related Art

Both the capacity and speed of a semiconductor memory, which may be used as a storage device in most recent memory systems, are increasing. Furthermore, various attempts are being made for mounting a memory with a larger capacity within a smaller space and efficiently operating the memory.

Recently, in order to increase the integration of a semiconductor memory, a 3-dimensional (3D) structure including a plurality of stacked memory chips is being applied instead of a 2-dimensional (2D) structure. Based on demand for large integration and large capacity memories, a structure that employs a 3D stacked structure of the memory chips for increasing the capacity of a memory, increasing integration by reducing the size of a semiconductor chip, and reducing cost for manufacturing the same has been developed.

SUMMARY

Some example embodiments provide a semiconductor memory device capable of reducing delay associated with calculating a syndrome and a parity data of an error correction code (ECC) engine.

Some example embodiments provide a method of operating a semiconductor memory device capable of reducing delay associated with calculating a syndrome and a parity data of an error correction code (ECC) engine.

According to some example embodiments, a semiconductor memory device includes a buffer die and a plurality of buffer dies. The buffer die communicates with an external device. The plurality of memory dies are stacked on the buffer die and connect to the buffer die through a plurality of through substrate vias. Each of the plurality of memory dies includes a memory cell array and an error correction code (ECC) engine. The memory cell array includes a plurality of volatile memory cells coupled to a plurality of word-lines and a plurality of word-lines. The ECC engine performs a Reed-Solomon (RS) encoding, using a parity generation matrix, on main data to be stored in a target page of the memory cell array to generate parity data and performs an RS decoding, using a parity check matrix, on the main data and the parity data read from the target page to correct an error of the main data by unit of a symbol. The parity check matrix includes a first part and a second part. The first part includes a plurality of sub matrixes and each of the plurality of sub matrixes corresponds to two different symbols of a plurality of symbols in the main data. The second part associated with the parity data. Each of the plurality of sub matrixes includes two identity sub matrixes and two same alpha matrixes, the two identity sub matrixes are disposed in a first diagonal direction of the sub matrix and the two same alpha matrixes are disposed in a second diagonal direction crossing the first diagonal direction of the sub matrix. Each identity sub matrix and each alpha matrix includes p elements, p is a natural number greater than one and p corresponds to a number of data bits in each of the plurality of symbols. A number of high-level value elements in a y-th row of the parity check matrix is the same as a number of high-level value elements in a (y+p)-th row of the parity check matrix and y is a natural number equal to or smaller than p.

According to some example embodiments, a semiconductor memory device includes a memory cell array and an error correction code (ECC) engine. The memory cell array includes a plurality of volatile memory cells coupled to a plurality of word-lines and a plurality of word-lines. The ECC engine performs a Reed-Solomon (RS) encoding, using a parity generation matrix, on main data to be stored in a target page of the memory cell array to generate parity data and performs a RS decoding, using a parity check matrix, on the main data and the parity data read from the target page to correct an error of the main data by unit of a symbol. The parity check matrix includes a first part and a second part. The first part includes a plurality of sub matrixes and each of the plurality of sub matrixes corresponds to two different symbols of a plurality of symbols in the main data. The second part associated with the parity data. Each of the plurality of sub matrixes includes two identity sub matrixes and two same alpha matrixes, the two identity sub matrixes are disposed in a first diagonal direction of the sub matrix and the two same alpha matrixes are disposed in a second diagonal direction crossing the first diagonal direction of the sub matrix. Each identity sub matrix and each alpha matrix includes p elements, p is a natural number greater than one and p corresponds to a number of data bits in each of the plurality of symbols. A number of high-level value elements in a y-th row of the parity check matrix is the same as a number of high-level value elements in a (y+p)-th row of the parity check matrix and y is a natural number equal to or smaller than p.

According to some example embodiments, there is provided a method of operating a semiconductor memory device, wherein the semiconductor memory device includes a buffer die to communicate with an external device and a plurality of memory dies stacked on the buffer die and connecting to the buffer die through a plurality of through substrate vias. According to the method, a Reed-Solomon (RS) encoding is performed, by an error correction code (ECC) engine, in a first memory die of the plurality of memory dies, using a parity generation matrix, on main data to generate parity data, the main data and the parity data are stored in a target page of a memory cell array of the first memory die, and a RS decoding is performed, by the ECC engine, using a parity check matrix, on the main data and the parity data read from the target page, to correct an error of the main data by unit of a symbol. The parity check matrix includes a first part and a second part. The first part includes a plurality of sub matrixes and each of the plurality of sub matrixes corresponds to two different symbols of a plurality of symbols in the main data. The second part associated with the parity data. Each of the plurality of sub matrixes includes two identity sub matrixes and two same alpha matrixes, the two identity sub matrixes are disposed in a first diagonal direction of the sub matrix and the two same alpha matrixes are disposed in a second diagonal direction crossing the first diagonal direction of the sub matrix. Each identity sub matrix and each alpha matrix includes p elements, p is a natural number greater than one and p corresponds to a number of data bits in each of the plurality of symbols. A number of high-level value elements in a y-th row of the parity check matrix is the same as a number of high-level value elements in a (y+p)-th row of the parity check matrix and y is a natural number equal to or smaller than p.

Accordingly, the parity check matrix may be configured such that each of plurality of sub matrixes may include two identity sub matrixes and two same alpha matrixes, the two identity sub matrixes may be disposed in a first diagonal direction of the sub matrix and the two same alpha matrixes may be disposed in a second diagonal direction crossing the first diagonal direction of the sub matrix. A number of high-level value elements in a y-th row of the parity check matrix is the same as a number of high-level value elements in a (y+p)-th row of the parity check matrix. Therefore, the ECC engine may reduce delay generated associated with calculating a syndrome and a parity data, because a configuration of the parity check matrix is simplified.

BRIEF DESCRIPTION OF THE DRAWINGS

Illustrative, non-limiting example embodiments will be more clearly understood from the following detailed description in conjunction with the accompanying drawings.

FIG. 12 illustrates an identity sub matrix and a zero sub matrix in the parity generation matrix in FIG. 10.

FIG. 13 illustrates one of alpha matrixes in the parity generation matrix in FIG. 10.

FIG. 14 illustrates one of the sub matrixes in the parity generation matrix in FIG. 10.

FIG. 15 illustrates an identity sub matrix and a zero sub matrix in the parity generation matrix in FIG. 10.

FIG. 16 illustrates one of alpha matrixes in the parity generation matrix in FIG. 10.

FIG. 19 illustrates one of the sub matrixes in the parity generation matrix in FIG. 10.

FIG. 20 illustrates that the ECC engine of FIG. 9 generates the error magnitude syndrome and the error locator syndrome based on the parity check matrix.

FIG. 21 illustrates an example of the syndrome according to example embodiments.

DETAILED DESCRIPTION OF THE EMBODIMENTS

Example embodiments will be described more fully hereinafter with reference to the accompanying drawings.

Figure 1:
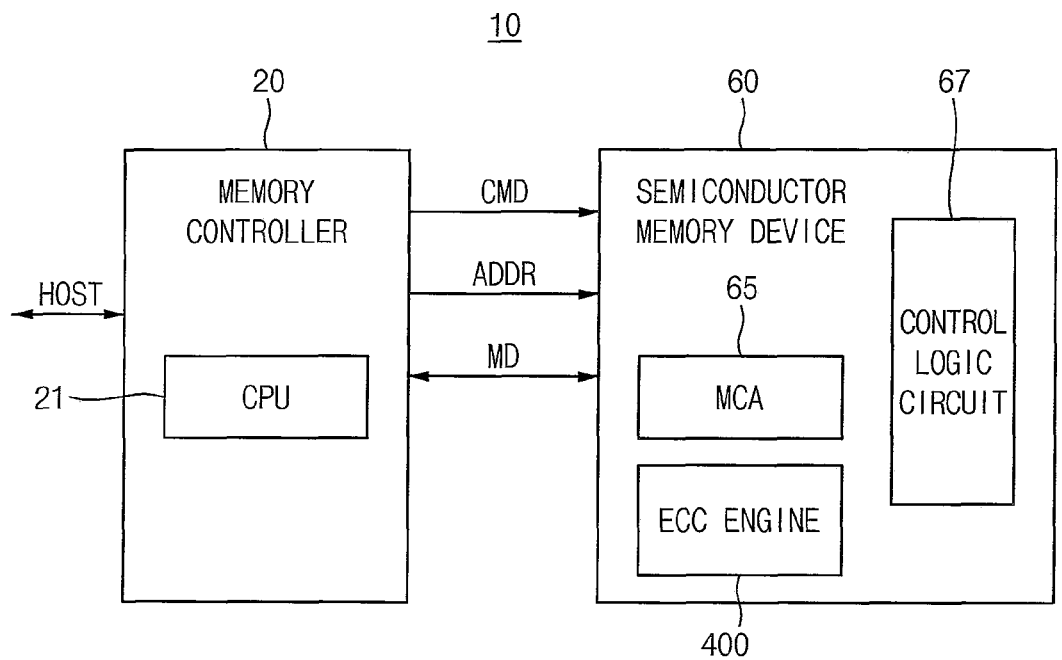
FIG. 1 is a block diagram illustrating a memory system according to example embodiments.

FIG. 1 is a block diagram illustrating a memory system according to example embodiments.

Referring to FIG. 1, a memory system 10 may include a memory controller 20 and a semiconductor memory device 60. The memory controller 20 may include a central processing unit (CPU) 21, may provide a command (signal) CMD, an address (signal) ADDR to the semiconductor memory device 60, and may exchange a main data MD with the semiconductor memory device 60.

The memory controller 20 may access the semiconductor memory device 60 based on a request from an external host. The memory controller 20 may communicate with the host through various protocols. The CPU 21 may control overall operation of the memory controller 20.

The semiconductor memory device 60 may include a memory cell array (MCA) 65, a control logic circuit 67 and an error correction code (ECC) engine 400.

The memory cell array 65 may include a plurality of memory cell rows, each of the plurality of memory cell rows includes a plurality of volatile memory cells coupled to a plurality of word-lines and a plurality of bit-lines.

The ECC engine 400, in a write operation, may perform a Reed-Solomon (RS) encoding on the main data MD to generate parity data and may store the main data MD and the parity data in a target page of the memory cell array 62. The ECC engine 400, in a read operation, may perform an RS decoding on the main data MD and the parity data read from the target page to correct an error of the main data MD by unit of a symbol.

Throughout the specification, the symbol is a basic unit of the RS encoding and the RS decoding and refers to data including predetermined data bits. For example, one symbol may include 8-bit or 16-bit data bits. The phrase 'by unit of a symbol' means that the ECC engine 400 performs the RS encoding in each symbol in the main data MD to generate the parity data and performs the RS decoding in each symbol in the main data MD to detect and/or correct an error in each symbol.

The ECC engine 400, and other components described as engines, blocks, units, or modules, or components ending in ~er or ~or are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the engines, blocks, units and/or modules being implemented by microprocessors or similar, they may be programmed using software (e.g., microcode) to perform various functions discussed herein and may optionally be driven by firmware and/or software. Alternatively, each engine, block, unit and/or module may be implemented by dedicated hardware, or as a combination of dedicated hardware to perform some functions and a processor (e.g., one or more programmed microprocessors and associated circuitry) to perform other functions.

The control logic circuit 67 may control the ECC engine 400 based on the command CMD and the address ADDR from the memory controller 20. The control logic circuit 67 may control the RS encoding operation and the RS decoding operation of the ECC engine 400.

As will be described later, the ECC engine 400 may control the RS encoding and the RS decoding using a parity check matrix. The parity check matrix include plurality of sub matrixes and each of the plurality of sub matrixes may correspond to two different symbols of a plurality of symbols in the main data MD. The parity check matrix may be configured such that each of a plurality of sub matrixes may include two identity sub matrixes and two same alpha matrixes, the two identity sub matrixes may be disposed in a first diagonal direction of the sub matrix and the two same alpha matrixes may be disposed in a second diagonal direction crossing the first diagonal direction of the sub matrix. In some embodiments, each of the identity sub matrix and the alpha matrix includes p elements, p is a natural number greater than one and p corresponds to a number of data bits in each of the plurality of symbols. A number of high-level value elements in a y-th row of the parity check matrix may be the same as a number of high-level value elements in a (y+p)-th row of the parity check matrix and y is a natural number equal to or smaller than p. Therefore, the ECC engine 400 may reduce delay generated associated with calculating a syndrome and a parity data, because a configuration of the parity check matrix is simplified.

Figure 2:
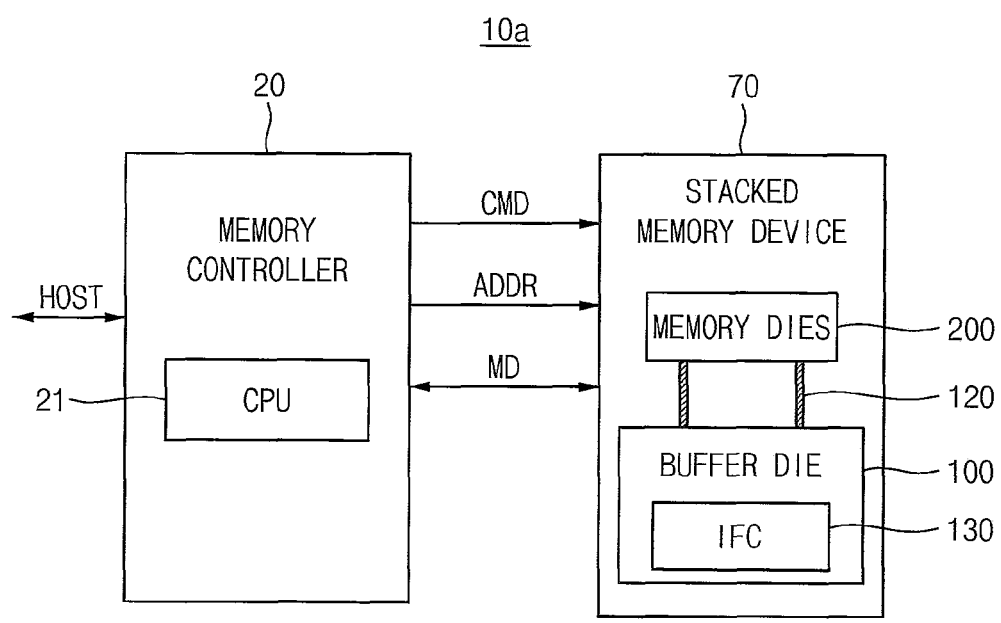
FIG. 2 is a block diagram illustrating a memory system according to example embodiments.

FIG. 2 is a block diagram illustrating a memory system according to example embodiments.

Referring to FIG. 2, a memory system 10a may include a memory controller 20 and a stacked memory device 70. The stacked memory device 70 may be referred to as a semiconductor memory device. Description on the memory controller 20 is the same as the description with reference to FIG. 1, and thus, description on the memory controller 20 will be omitted.

The stacked memory device 70 may include a buffer die 100 and a plurality of memory dies 200 stacked on the buffer die 100. The buffer die 100 and the memory dies 200 may be sequentially stacked on each other. The memory dies 200 stacked on the buffer die 100 may be electrically connected to the buffer die 100 through conducting means. The conducting means may be one or more through silicon vias, more generally described as through substrate vias (TSV)s 120. The memory dies 200 may be referred to as core dies.

The buffer die 100 may communicate with the memory controller 20, and each of the memory dies 100 may be a dynamic random access memory (DRAM) device including a plurality of dynamic memory cells, such as Double Data Rate (DDR) Synchronous Dynamic Random Access Memory (SDRAM). Each of the memory dies 200 may include a memory cell array, an ECC engine and a control logic circuit.

The ECC engine may control the RS encoding and the RS decoding using a parity check matrix. The parity check matrix may include plurality of sub matrixes and each of the plurality of sub matrixes may correspond to two different symbols of a plurality of symbols in the main data. The parity check matrix may be configured such that each of plurality of sub matrixes may include two identity sub matrixes and two same alpha matrixes, the two identity sub matrixes may be disposed in a first diagonal direction of the sub matrix and the two same alpha matrixes may be disposed in a second diagonal direction crossing the first diagonal direction of the sub matrix. Each of the identity sub matrix and the alpha matrix may include p elements, p being a natural number greater than one and p corresponding to a number of data bits in each of the plurality of symbols. A number of high-level value elements in a y-th row of the parity check matrix may be the same as a number of high-level value elements in a (y+p)-th row of the parity check matrix, where y is a natural number equal to or smaller than p. Therefore, the ECC engine may reduce delay generated in association with calculating a syndrome and a parity data, because a configuration of the parity check matrix is simplified.

The buffer die 100 may include an interface circuit 130. The interface circuit 130 may be coupled to the TSVs 120, and may provide the memory controller 20 with a main data MD or a corrected main data from one of the memory dies 200.

Figure 3:
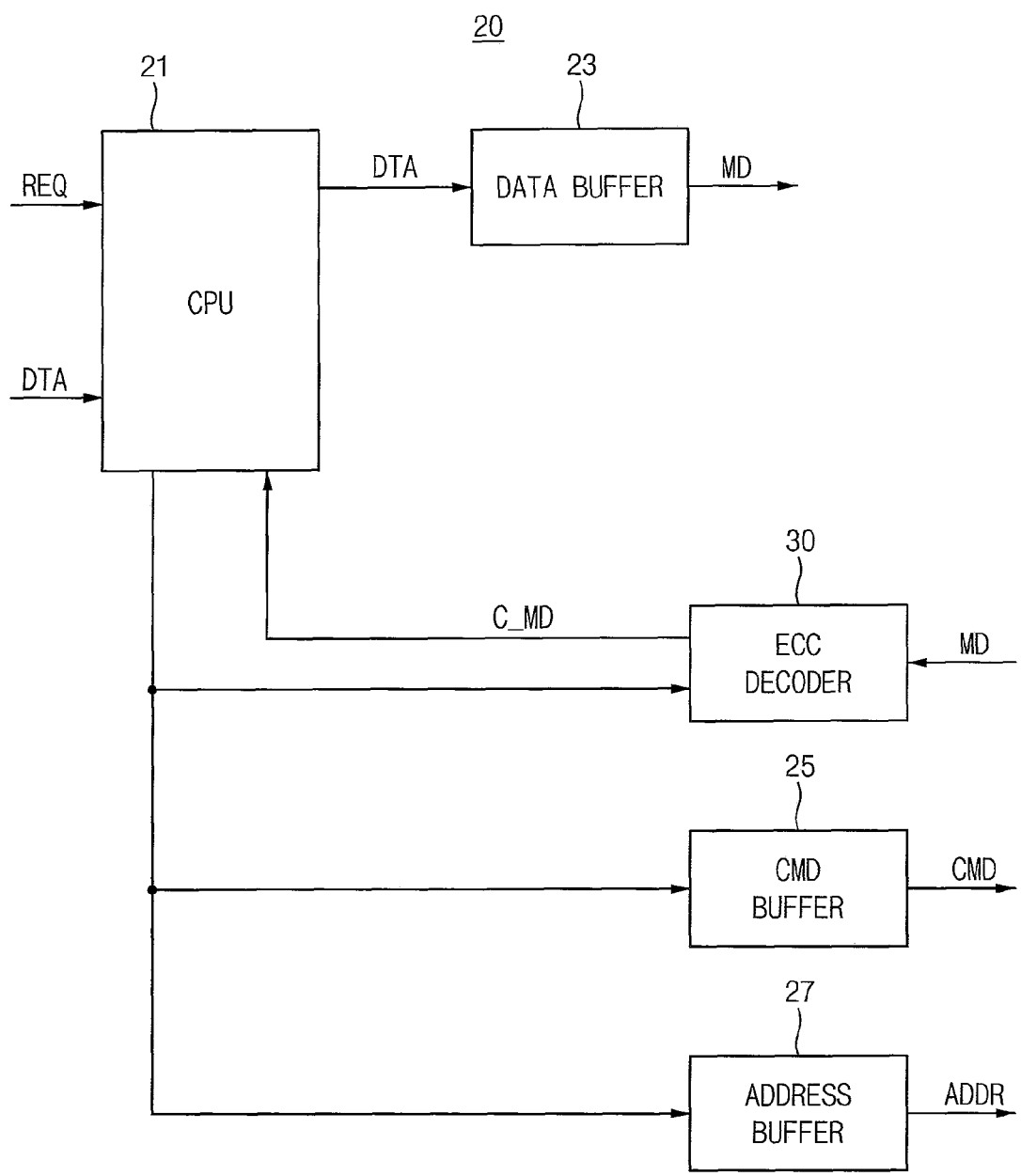
FIG. 3 is a block diagram illustrating an example of the memory controller in FIG. 2 according to example embodiments.

FIG. 3 is a block diagram illustrating an example of the memory controller in FIG. 2 according to example embodiments.

Referring to FIG. 3, the memory controller 20 may include the CPU 21, a data buffer 23, an ECC decoder 30, a command buffer 25 and an address buffer 27. In an example embodiment, the ECC decoder 30 may not be included in the memory controller 20.

The CPU 21 may receive a request REQ and data DTA from the host, and may provide the data DTA to the data buffer 23.

The data buffer 23 may buffer the data DTA to provide the main data MD to the stacked memory device 70 (or the semiconductor memory device 60).

The ECC decoder 30, in a read operation, may receive the main data MD from the stacked memory device 70, may perform an ECC decoding on the main data MD to correct at least one error in the main data MD and may provide a corrected data C_MD to the CPU 21.

The command buffer 25 may store the command CMD corresponding to the request REQ and may transmit the command CMD to the stacked memory device 70 under control of the CPU 21. The address buffer 27 may store the address ADDR and may transmit the address ADDR to the stacked memory device 70 under control of the CPU 21.

Figure 4:
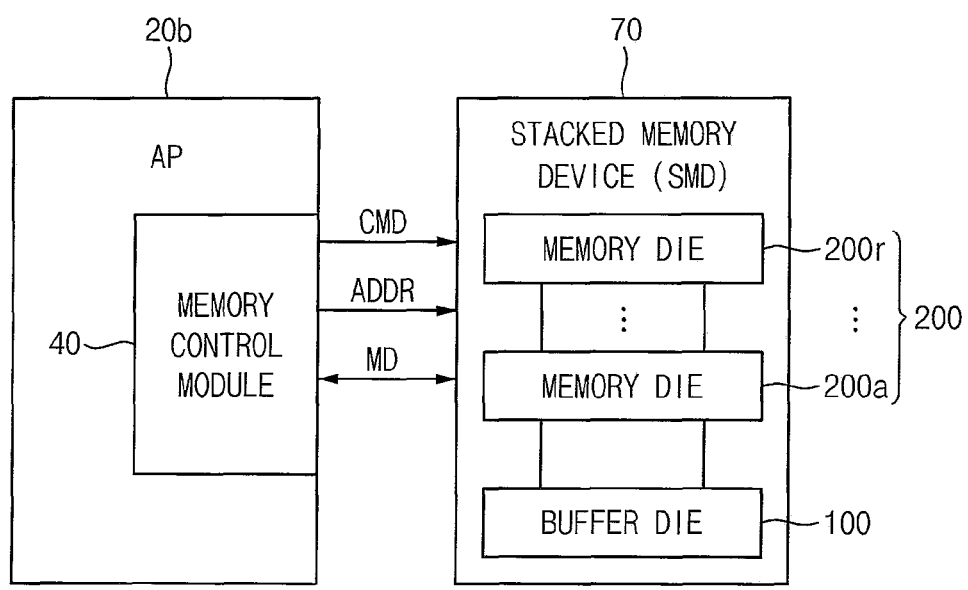
FIG. 4 is a block diagram illustrating a data processing system according to example embodiments.

FIG. 4 is a block diagram illustrating a data processing system according to example embodiments.

Referring to FIG. 4, a data processing system (or, a memory system) 10b may include an application processor 20b and a stacked memory device 70. The application processor 20b may include a memory control module 40 and the memory control module 40 included in application processor 20b and the stacked memory device 70 may constitute a memory system. The stacked memory device 70 may include the buffer die 100 and memory devices 200 and the memory devices 200 include a plurality memory dies 200a~200r which are stacked on top of another memory die. Here, r is an integer greater than one.

The application processor 20b may perform a function of the host. Further, the application processor 20b may be implemented as a system on chip (SoC). The SoC may include a system bus (not illustrated) to which a protocol having a predetermined standard bus specification is applied, and may include various types of intellectual property (IP) cores connected to the system bus.

The memory control module 40 may perform a function of the memory controller 20 in FIG. 2.

In example embodiments, the application processor 20b may include a graphics processing unit (GPU) instead of the memory control module 40 and the GPU may perform a function of the memory controller 20 in FIG. 2. The GPU may store, in the stacked memory device 70, data which is generated during graphics processing.

Figure 5:
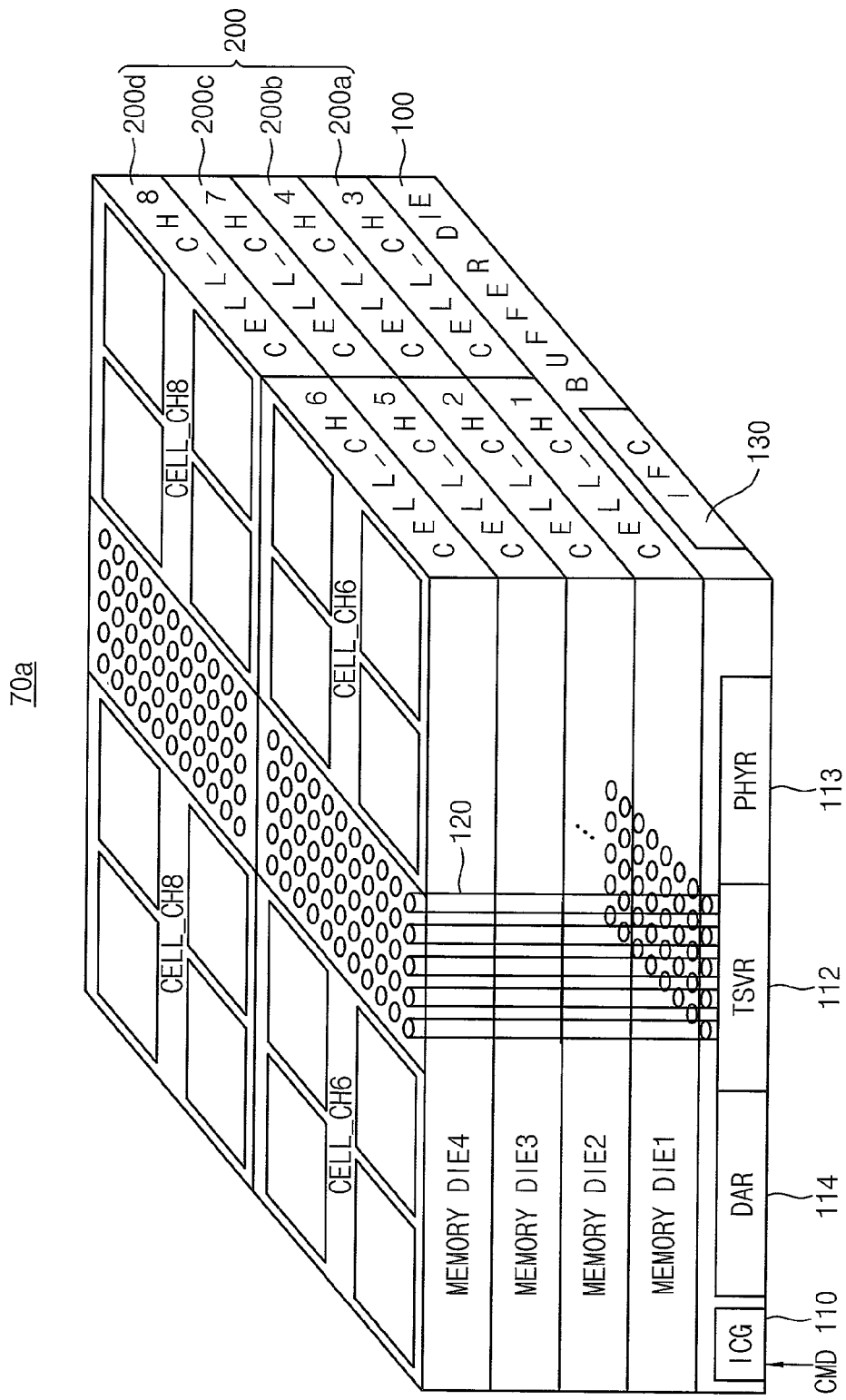
FIG. 5 is a block diagram illustrating an example of the stacked memory device in FIG. 2 according to example embodiments.

FIG. 5 is a block diagram illustrating an example of the stacked memory device in FIG. 2 according to example embodiments.

In FIG. 5, a memory device in a high bandwidth memory (HBM) form having an increased bandwidth by including a plurality of independent channels having independent interfaces is illustrated.

Referring to FIG. 5, a stacked memory device 70a may include a plurality of layers. For example, the stacked memory device 70a may include the buffer die 100 and one or more memory dies 200 which are stacked on buffer die 100. In the example of FIG. 5, although first to fourth memory dies 200a~200d are illustrated as being provided, the number of the core dies may be variously changed.

Further, each of the memory dies 200 may include one or more channels. A single memory die includes two channels in the example of FIG. 5, and thus an example in which the stacked memory device 70a has eight channels CH1 to CH8 is illustrated. However, a single memory die may include four channels in example embodiments.

For example, a first memory die 200a may include a first channel CH1 and a third channel CH3, a second memory die 200b may include a second channel CH2 and a fourth channel CH4, a third memory die 200c may include a fifth memory channel CH5 and a seventh channel CH7, and a fourth memory die 200d may include a sixth channel CH6 and an eighth channel CH8.

The buffer die 100 may communicate with the memory controller (e.g., an external device), may receive a command, an address, and data from the memory controller, and may provide the received command, address, and data to the memory dies 200. The buffer die 100 may communicate with the memory controller through a conductive means (not illustrated) such as bumps and the like which are formed on an outer surface thereof. The buffer die 100 may buffer the command, the address, and the data, and thus the memory controller may interface with the memory dies 200 by driving only a load of the buffer die 100.

Further, the stacked memory device 70a may include a plurality of TSVs 120 passing through the layers.

The TSVs 120 may be disposed corresponding to the plurality of channels CH1 to CH8, may be disposed to pass through the first to fourth memory dies 200a to 200d, and each of the first to fourth memory dies 200a to 200d may include a transmitter/receiver connected to the TSVs 120. When a normal operation in which the inputting and outputting of the data is independently performed for each channel, only the transmitter/receiver of any one core die may be enabled, with respect to each of the TSVs 120, and thus each of the TSVs 120 may independently deliver only the data of any one memory die, or any channel, as an independent channel for that one memory die or channel.

The buffer die 100 may include an internal command generator 110, the interface circuit 130, a TSV region TSVR 112, a physical region PHYR 113 and a direct access region DAR 114. The internal command generator 110 may generate an internal command based on the command CMD.

The TSV region 112 is a region in which TSVs 120 for communicating with the memory dies 200 are formed. Further, the physical region 113 is a region including a plurality of input-and-output (IO) circuits for communicating with an external memory controller, and various types of signals from the memory controller may be provided to the TSV region 112 through the physical region 113 and to the memory dies 200 through the TSVs 120.

The direct access region 114 may directly communicate with an external test device in a test mode for the stacked memory device 70a through a conductive means which is disposed on an outer surface of the stacked memory device 70a. Various types of signals provided from the tester may be provided to the memory dies 200 through the direct access region 114 and the TSV region 112.

The interface circuit 130 may provide the address and the data from the external device to a target memory die (i.e., one of the memory dies 200) and may provide the external device with a main data from the target memory die.

In addition, the interface circuit 130 may provide the external device with a decoding status flag indicating an error status in the data from the target memory die.

Figure 6:
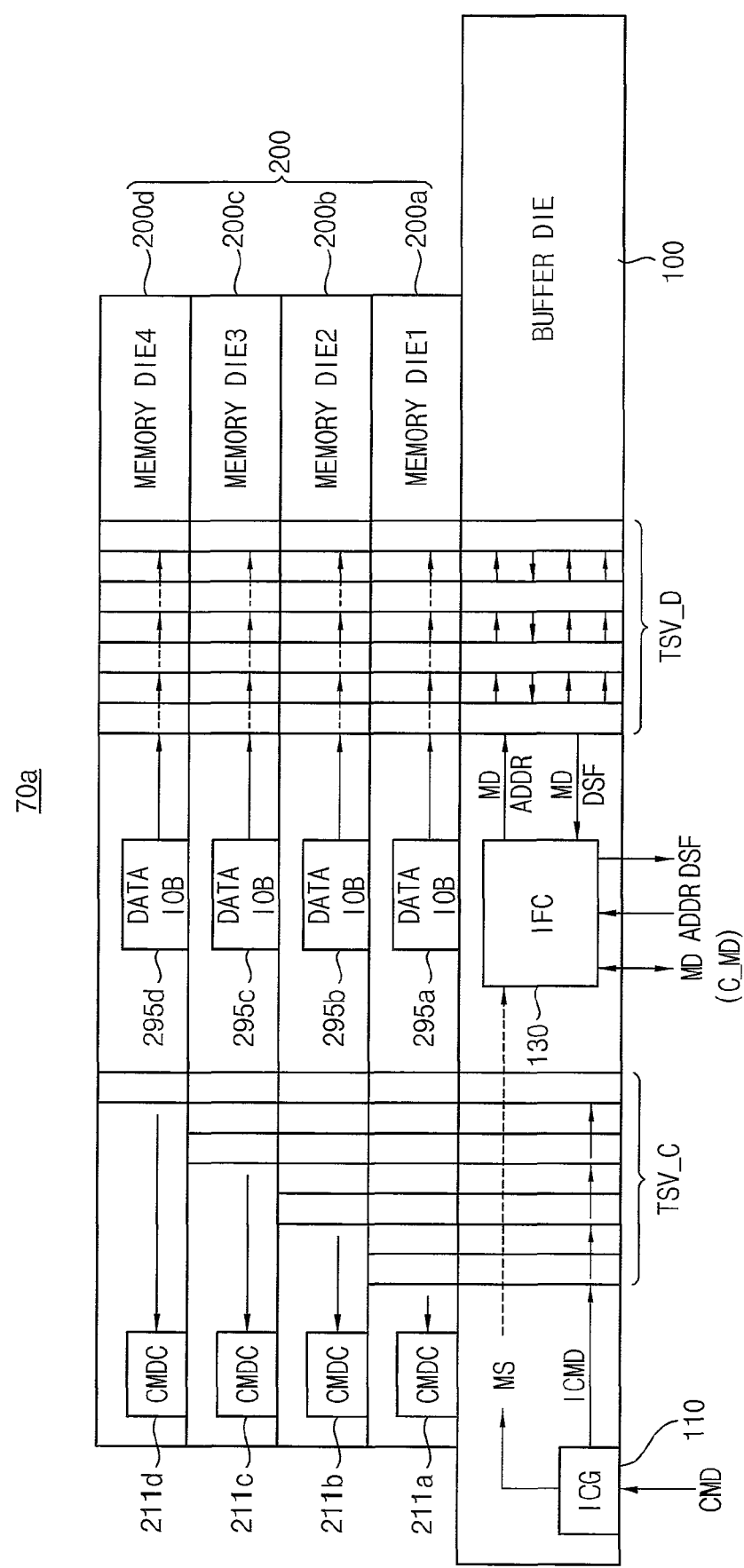
FIG. 6 illustrates operation of the interface circuit in the stacked memory device of FIG. according to example embodiments.

FIG. 6 illustrates operation of the interface circuit in the stacked memory device of FIG. 5.

Referring to FIGS. 5 and 6, the buffer die 100 may include the internal command generator 110 and the interface circuit 130. Internal commands ICMD from the internal command generator 110 may be provided to the memory dies 200 through command TSVs TSV_C which are independently formed for each channel. The internal command generator 110 may provide the interface circuit 130 with a mode signal MS designating one of a plurality of operation modes based on the command CMD.

The interface circuit 130 may provide the main data MD to a corresponding memory die through data TSVs TSV_D which are commonly formed for each channel in a write operation in response to the mode signal MS.

The interface circuit 130 may provide the external device with the main data MD or a corrected main data C_MD with a decoding status flag DSF provided from the target memory die through data TSVs TSV_D in a read operation in response to the mode signal MS.

Each of the memory dies 200a to 200d may respectively include command decoders 211a to 211d which output internal control signals by decoding internal command ICMD, and data input/output (I/O) buffer (JOB) 295a to 295d which provide/receive data to/from the data TSVs TSV_D.

Referring to one of the memory dies 200a to 200d (for example, the first memory die 200a), the first memory die 200a may perform a memory operation according to a decoding result of the command decoder 211a, and for example, data of a plurality of bits stored in a memory cell region inside the first memory die 200a may be read and provided to the data I/O buffer 295a. The data I/O buffer 295a may process the data of the plurality of bits in parallel, and output the data processed in parallel to a plurality of data TSVs TSV_D in parallel.

Figure 7:
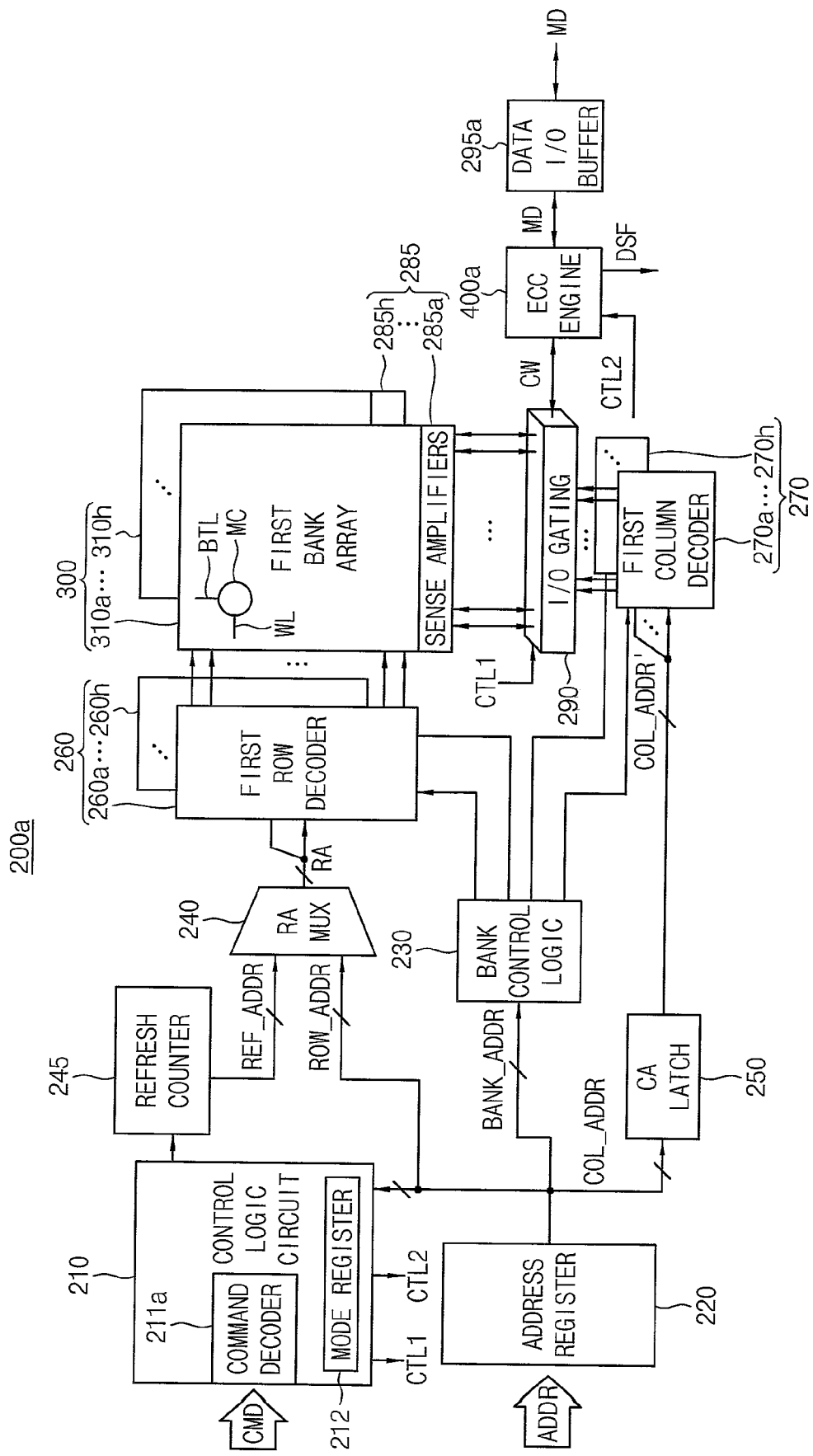
FIG. 7 is a block diagram illustrating an example of one of the memory dies in the stacked memory device in FIG. 6 according to example embodiments.

FIG. 7 is a block diagram illustrating an example of one of the memory dies in the stacked memory device in FIG. 6 according to example embodiments.

In FIG. 7, a configuration of the memory die 200a is illustrated, and each configuration of the plurality of memory dies 200b~200d may be substantially the same as the configuration of the memory die 200a.

Referring to FIG. 7, the memory die 200a may include a control logic circuit 210, an address register 220, a bank control logic 230, a row address multiplexer 240, a column address latch 250, a row decoder 260, a column decoder 270, a memory cell array 300, a sense amplifier unit 285, an I/O gating circuit 290, an ECC engine 400a, a data I/O buffer 295a and a refresh counter 245.

The memory cell array 300 may include first through eighth bank arrays 310a~310h.

The row decoder 260 may include first through eighth row decoders 260a~260h coupled to the first through eighth bank arrays 310a~310h, respectively, the column decoder 270 may include first through eighth column decoders 270a~270h coupled to the first through eighth bank arrays 310a~310h, respectively, and the sense amplifier unit 285 may include first through eighth sense amplifiers 285a~285h coupled to the first through eighth bank arrays 310a~310h, respectively.

The first through eighth bank arrays 310a~310h, the first through eighth row decoders 260a~260h, the first through eighth column decoders 270a~270h, and the first through eighth sense amplifiers 285a~285h may form first through eighth banks. Each of the first through eighth bank arrays 310a~310h may include a plurality of word-lines WL, a plurality of bit-lines BL, and a plurality of memory cells MC formed at intersections of the word-lines WL and the bit-lines BTL.

Although the memory die 200a is illustrated in FIG. 7 as including eight banks, the memory die 200a may include any number of banks.

The address register 220 may receive the address ADDR including a bank address BANK_ADDR, a row address ROW_ADDR, and a column address COL_ADDR from the memory controller 20. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through eighth bank row decoders 260a~260h corresponding to the bank address BANK_ADDR may be activated in response to the bank control signals, and one of the first through eighth bank column decoders 270a~270h corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first through eighth bank row decoders 260a~260h.

The activated one of the first through eighth row decoders 260a~260h may decode the row address RA that is output from the row address multiplexer 240, and may activate a word-line WL corresponding to the row address RA. For example, the activated row decoder may generate a word-line driving voltage and may apply the word-line driving voltage to the word-line WL corresponding to the row address RA.

The column address latch 250 may receive the column address COL_ADDR from the address register 220, and may temporarily store the received column address COL_ADDR. In example embodiments, in a burst mode, the column address latch 250 may generate column addresses COL_ADDR' that increment from the received column address COL_ADDR. The column address latch 250 may apply the temporarily stored or generated column address COL_ADDR' to the first through eighth column decoders 270a~270h.

The activated one of the first through eighth column decoders 270a~270h may decode the column address COL_ADDR' that is output from the column address latch 250, and may control the I/O gating circuit 290 to output data corresponding to the column address COL_ADDR'.

The I/O gating circuit 290 may include circuitry for gating input/output data. The I/O gating circuit 290 may further include read data latches for storing data that is output from the first through eighth bank arrays 310a~310h, and write control devices for writing data to the first through eighth bank arrays 310a~310h.

A codeword CW read from one of the first through eighth bank arrays 310a~310h may be sensed by a sense amplifier coupled to the one bank array from which the data is to be read, and may be stored in the read data latches.

The codeword CW stored in the read data latches may be provided to the ECC engine 400a. The ECC engine 400a may perform the RS decoding on the codeword CW to correct an error by unit of symbol and may provide the memory controller 20 with a corrected main data MD through the data I/O buffer 295a.

The main data MD to be stored in one of the first through eighth bank arrays 310a~310h may be provided to the data I/O buffer 295a from the memory controller 20. The data I/O buffer 295a provides the main data MD to the ECC engine 400a. The ECC engine 400a performs a RS encoding on the main data MD to generate a parity data and provide the I/O gating circuit 290 with the codeword CW including the main data MD and the parity data.

The ECC engine 400a may generate the decoding status flag DSF indicating an error status in the codeword CW and may provide the decoding status flag DSF to the memory controller 20.

The control logic circuit 210 may control operations of the memory die 200a. For example, the control logic circuit 210 may generate control signals for the memory die 200a to perform the write operation or the read operation.

The control logic circuit 210 may include the command decoder 211a that decodes the command CMD received from the memory controller 20 and a mode register 212 that sets an operation mode of the memory die 200a. The control logic circuit 210 may generate a first control signal CTL1 to control the I/O gating circuit 290 and a second control signal CTL2 to control the ECC engine 400a, may provide the first control signal CTL1 to the I/O gating circuit 290 and may provide the second control signal CTL2 to the ECC engine 400a.

Figure 8:
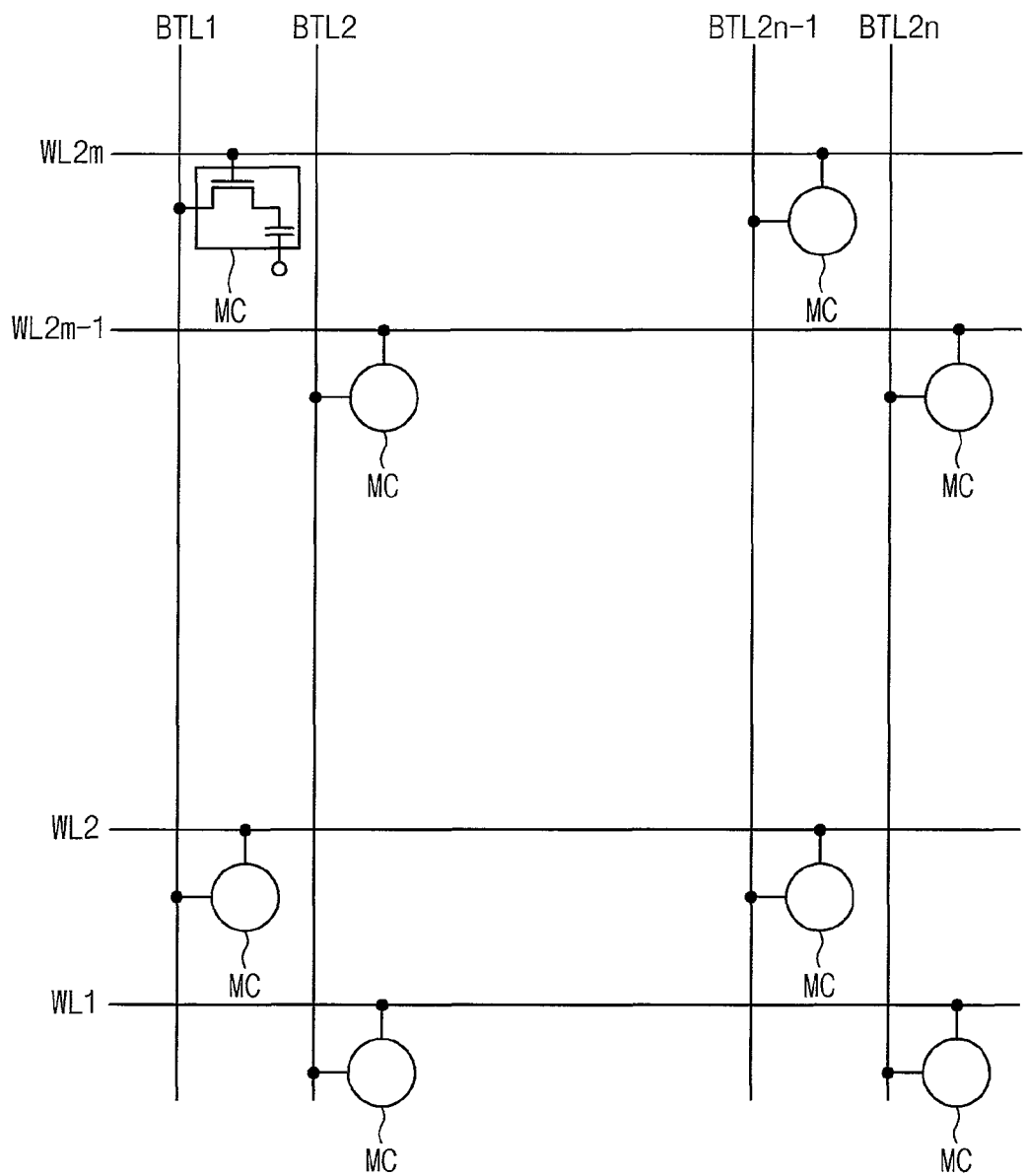
FIG. 8 illustrates a first bank array in the memory die of FIG. 7 according to example embodiments.

FIG. 8 illustrates a first bank array in the memory die of FIG. 7 according to example embodiments.

Referring to FIG. 8, the first bank array 310a may include a plurality of word-lines WL1~WL2m (where m is a natural number greater than two), a plurality of bit-lines BTL1~BTL2n (where n is a natural number greater than two), and a plurality of memory cells MCs disposed near intersections between the word-lines WL1~WL2m and the bit-lines BTL1~BTL2n. In an example embodiment, each of the plurality of memory cells MCs may include a DRAM cell structure. The plurality of word-lines WL1~WL2m to which the plurality of memory cells MCs are connected may be referred to as rows of the first bank array 310a and the plurality of bit-lines BL1~BL2n to which the plurality of memory cells MCs are connected may be referred to as columns of the first bank array 310a.

Figure 9A:
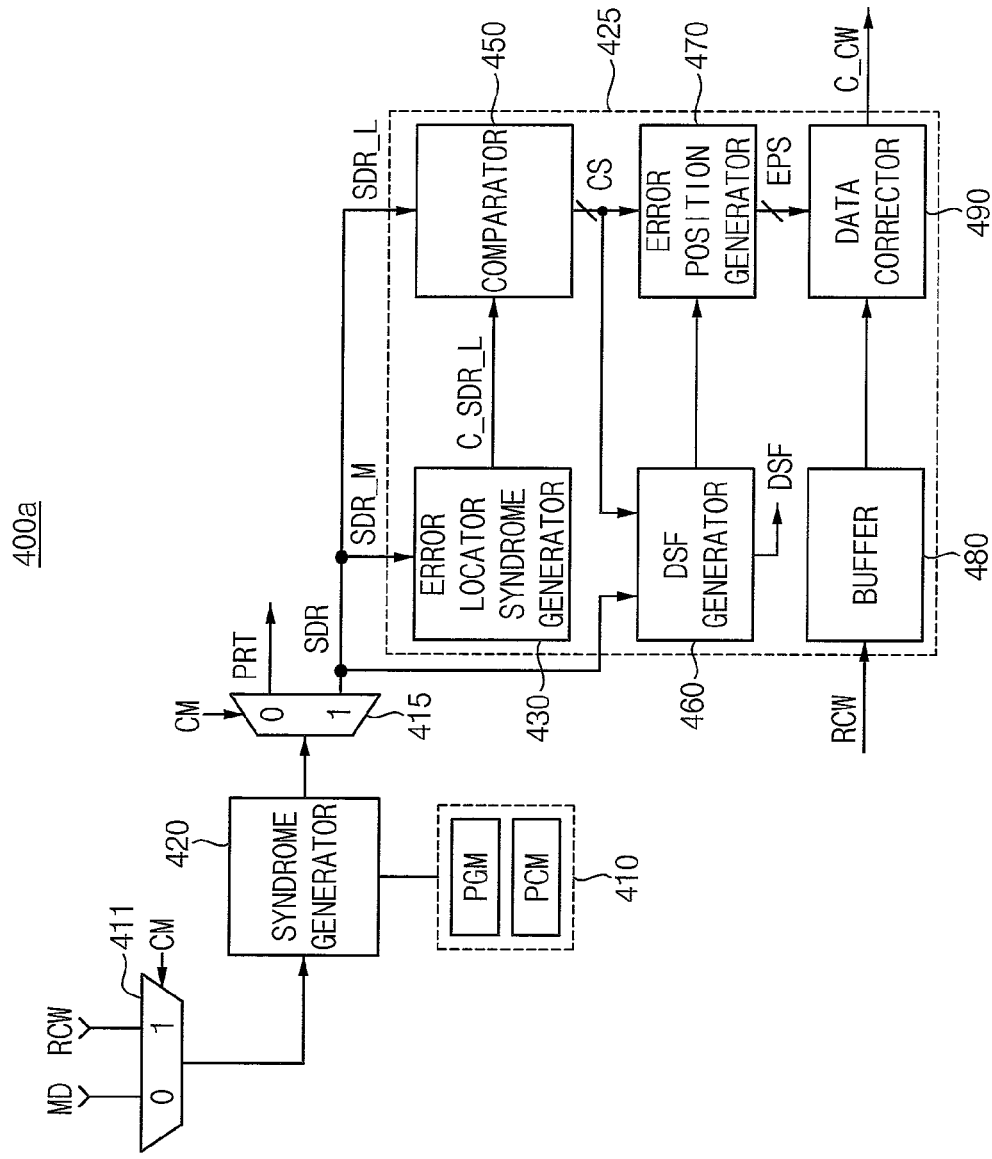
FIG. 9A is a block diagram illustrating an example of the ECC engine in the memory die of FIG. 7 according to example embodiments.

FIG. 9A is a block diagram illustrating an example of the ECC engine in the memory die of FIG. 7 according to example embodiments.

Referring to FIG. 9A, the ECC engine 400a may include a memory 410, a multiplexer 411, a syndrome generator 420, a demultiplexer 415 and an RS decoder 425.

The multiplexer 411, in response to a coding mode signal CM designating an encoding operation and a decoding operation, may select the main data MD in the encoding operation of a write operation, may provide the main data MD to the syndrome generator 420, may select a read codeword RCW in the decoding operation of a read operation and may provide the read codeword RCW to the syndrome generator 420.

The memory 410 may store a parity generation matrix PGM and a parity check matrix PCM.

The syndrome generator 420 may generate a parity data based on the parity generation matrix PGM and the main data MD in the encoding operation and may generate a syndrome based on the parity check matrix PCM and the read codeword RCW in the decoding operation.

The demultiplexer 415, in response to the coding mode signal CM, may provide an output of the syndrome generator 420 to a target page as a parity data PRT in the encoding operation and may provide output of the syndrome generator 420 to the RS decoder 425 as a syndrome SDR in the decoding operation.

The RS decoder 425 may include an error locator syndrome generator 430, a comparator 450, a decoding status flag (DSF) generator 460, an error position generator 470, a buffer 480 and a data corrector 490.

The syndrome SDR may include an error magnitude syndrome SDR_M indicating a number of errors in the read codeword RCW and an error locator syndrome SDR_L indicating a position of a symbol including an error.

The error locator syndrome generator 430, in the decoding operation, may generate a comparative error locator syndrome C_SDR_L by multiplying the error magnitude syndrome SDR_M by an alpha matrix corresponding to the error in the syndrome SDR.

The comparator 450 may output a comparison signal CS by comparing the error locator syndrome SDR_L with the comparative error locator syndrome C_SDR_L. The comparison signal CS may indicate that the error locator syndrome SDR_L matches the comparative error locator syndrome C_SDR_L.

When the symbol includes a correctable error, the error locator syndrome SDR_L matches (is the same as) the comparative error locator syndrome C_SDR_L. In addition, when the symbol includes no error, the error locator syndrome SDR_L associated with the symbol including no error is different from the comparative error locator syndrome C_SDR_L.

When the read codeword RCW including errors exceeding error correction capability of the ECC engine 400a, the error locator syndrome SDR_L associated with all of the symbols is different from the comparative error locator syndrome C_SDR_L.

The DSF generator 460 may generate the decoding status flag DSF indicating error status of the syndrome SDR based on the syndrome SDR and the comparison signal CS and may provide the decoding status flag DSF to the control logic circuit 210a or the external device.

The error position generator 470 may generate an error position signal EPS indicating a position of the error in the read codeword RCW based on the comparison signal CS.

The buffer 480 may store the read codeword RCW and may provide the read codeword RCW to the data corrector 490.

The data corrector 490 may correct an error in the read codeword RCW based on the error position signal EPS to output the corrected codeword C_CW.

Figure 9B:
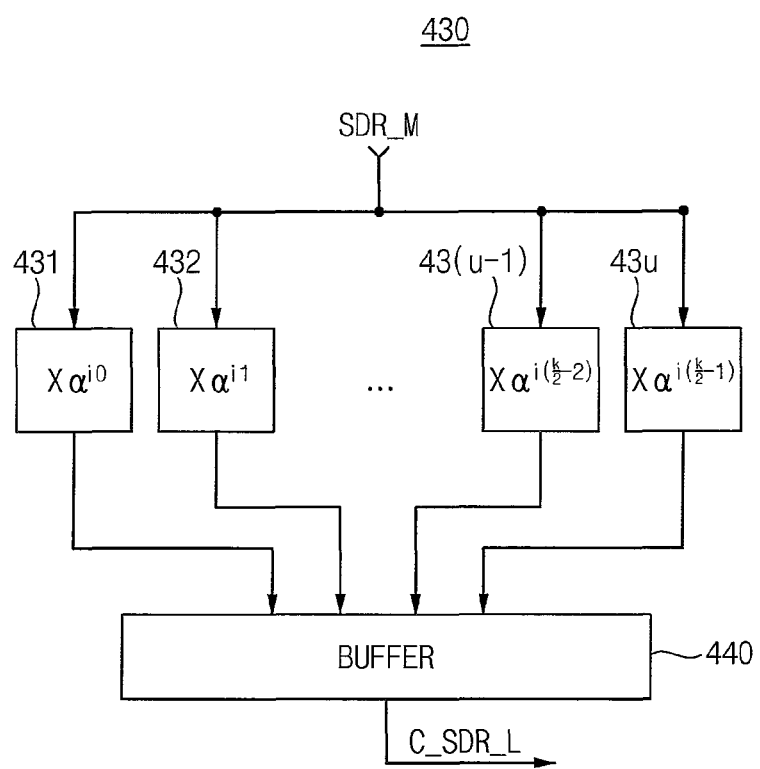
FIG. 9B illustrates an example of the error locator syndrome generator in the ECC engine of FIG. 9A according to example embodiments.

FIG. 9B illustrates an example of the error locator syndrome generator in the ECC engine of FIG. 9A according to example embodiments.

Referring to FIG. 9B, the error locator syndrome generator 430 may include a plurality of multipliers 431, 432, . . . , 43(u−1) and 43u and a buffer 440. Here, u is a natural number greater than 3.

Each of the plurality of multipliers 431, 432, . . . , 43(u−1) and 43u may multiply the error magnitude syndrome SDR_M by respective one of the k alpha matrixes $\alpha^{i0}$, $\alpha^{i1}$, . . . , $\alpha^{i(k/2-2)}$ and $\alpha^{i(k/2-1)}$ to provide the buffer 440 with a result of each multiplication. The k alpha matrixes $\alpha^{i0}$, $\alpha^{i1}$, . . . , $\alpha^{i(k/2-2)}$ and $\alpha^{i(k/2-1)}$ may correspond to k symbols in the read codeword RCW.

The buffer 440 may temporarily store respective output of the multipliers 431, 432, . . . , 43(u−1) and 43u and may output respective output of the multipliers 431, 432, . . . , 43(u−1) and 43u as a whole as the comparative error locator syndrome C_SDR_L.

Figure 10:
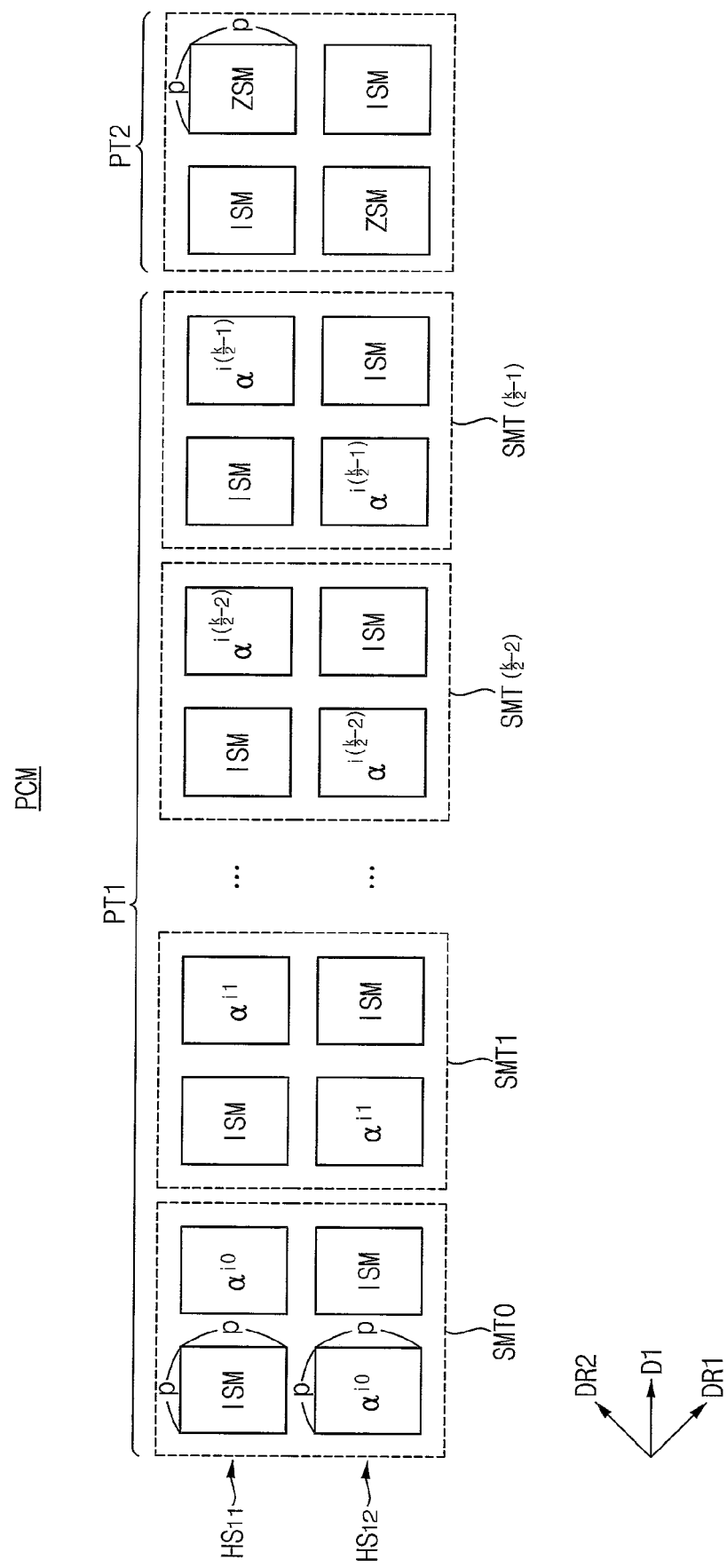
FIG. 10 illustrates an example of the parity check matrix stored in the memory in the ECC engine of FIG. 9A.

Further description on the alpha matrixes $\alpha^{i0}$, $\alpha^{i1}$, . . . , $\alpha^{i(k/2-2)}$ and $\alpha^{i(k/2-1)}$ is provided with reference to FIGS. 10 and 13.

FIG. 10 illustrates an example of the parity check matrix stored in the memory in the ECC engine of FIG. 9A.

Referring to FIG. 10, the parity check matrix PCM may include a first part PT1 and a second part PT2.

The first part PT1 may be associated with data bits in the main data MD in the read codeword RCW and the second part PT2 may be associated with parity bits in the parity data PRT in the read codeword RCW.

The first part PT1 may include a plurality of sub matrixes SMT0, SMT1, . . . , SMT(k/2-2) and SMT(k/2-1), and each of the plurality of sub matrixes SMT0, SMT1, . . . , SMT(k/2-2) and SMT(k/2-1) may correspond to two different symbols of a plurality of symbols in the main data MD. The second part PT2 may include two identity sub matrixes ISMs and two zero sub matrixes ZSMs which are associated with the parity data PRT.

Each of the plurality of sub matrixes SMT0, SMT1, SMT(k/2−2) and SMT(k/2−1) may include two identity sub matrixes ISMs disposed in a first diagonal direction DR1 of the sub matrix and two same alpha matrixes, corresponding to respective one of alpha matrixes $\alpha^{i0}, \alpha^{i1}, \ldots, \alpha^{i(k/2-2)}$ and $\alpha^{i(k/2-1)}$, disposed in a second diagonal direction DR2 crossing the first diagonal direction DR1 of the sub matrix.

Here, alpha matrix $\alpha^{i0}$ may be obtained based on a p-order primitive polynomial. The alpha matrix $\alpha^{i1}$ may be obtained by a power of the alpha matrix $\alpha^{i0}$ and elements of the alpha matrixes may be generated based on an RS code.

Each of the plurality of sub matrixes SMT0, SMT1, SMT(k/2−2) and SMT(k/2−1) has a configuration in which the two identity sub matrixes ISMs and the two same alpha matrixes are repeated in a crossing direction.

The alpha matrixes $\alpha^{i0}, \alpha^{i1}, \ldots, \alpha^{i(k/2-2)}$ and $\alpha^{i(k/2-1)}$ may belong to elements of a Galois field, and may be obtained by selecting k/2 candidate alpha matrixes whose number of high-level value elements is minimum from among k candidate alpha matrixes corresponding to the k symbols.

The alpha matrixes $\alpha^{i0}, \alpha^{i1}, \ldots, \alpha^{i(k/2-2)}$ and $\alpha^{i(k/2-1)}$ may represented by $\alpha^i$ and i is equal to or greater than one and equal to or smaller than $2^p-1$. Index i is one of i0, i1, ..., i(k/2)−2 and i(k/2)−2, a sum of two indices selected from indices i0, i1, ..., i(k/2)−2 and i(k/2)−2 is different from $2^p-1$, and each of the indices i0, i1, ..., i(k/2)−2 and i(k/2)−2 is not zero.

On these condition, a number of high-level value elements in a y-th row of the parity check matrix PCM is the same as a number of high-level value elements in a (y+p)-th row of the parity check matrix PCM and y is a natural number equal to or smaller than p.

The syndrome SDR may be generated by performing a matrix multiplication on a transposed matrix of a vector representation of the read codeword RCW and the parity check matrix PCM. The ECC engine 400a may reduce delay generated associated with calculating the syndrome SDR and the parity data PRT, because a configuration of the parity check matrix PCM is simplified.

The conventional RS decoder generates a parity check matrix by using alpha matrixes corresponding to a number of symbols in the main data and generates a syndrome and a parity data by performing a matrix multiplication on a read codeword and the parity check matrix. Therefore, a calculation skew occurs between syndrome bits in the syndrome and parity bits in the parity data according to a number of high-level value elements in the alpha matrixes when calculating the syndrome and the parity data. The skew corresponds to a difference between calculation timing associated with the syndrome and the parity data.

However, when the ECC engine 400a uses the parity check matrix PCM in FIG. 10, the parity check matrix PCM may be constituted based on the alpha matrixes corresponding to a half of a number of symbols in the main data, calculation time for the syndrome the parity data may be reduced because k/2 candidate alpha matrixes whose number of high-level value elements is minimum from among k candidate alpha matrixes are selected and calculation skew between the syndrome and the parity data may be reduced because a number of high-level value elements in a y-th row of the parity check matrix PCM is the same as a number of high-level value elements in a (y+p)-th row of the parity check matrix PCM.

The first part PT1 of the parity check matrix PCM may correspond to the parity generation matrix PGM in FIG. 9A.

The parity check matrix PCM may include a first sub check matrix $HS_{11}$ and a second sub check matrix $HS_{12}$. The first sub check matrix $HS_{11}$ may include a plurality of identity sub matrixes ISMs and the alpha matrixes $\alpha^{i0}, \alpha^{i1}, \alpha^{i(k/2-2)}$ and $\alpha^{i(k/2-1)}$ which are alternatingly disposed in a first direction D1. The second sub check matrix $HS_{12}$ may include a plurality of identity sub matrixes ISMs and the alpha matrixes $\alpha^{i0}, \alpha^{i1}, \ldots, \alpha^{i(k/2-2)}$ and $\alpha^{i(k/2-1)}$ which are alternatingly disposed in the first direction D1 in a reverse alternating order with respect to the first sub check matrix $HS_{11}$. Therefore, a number of high-level value elements in a y-th row of the parity check matrix PCM is the same as a number of high-level value elements in a (y+p)-th row of the parity check matrix PCM.

In FIG. 10, k is an even natural number.

Figure 11:
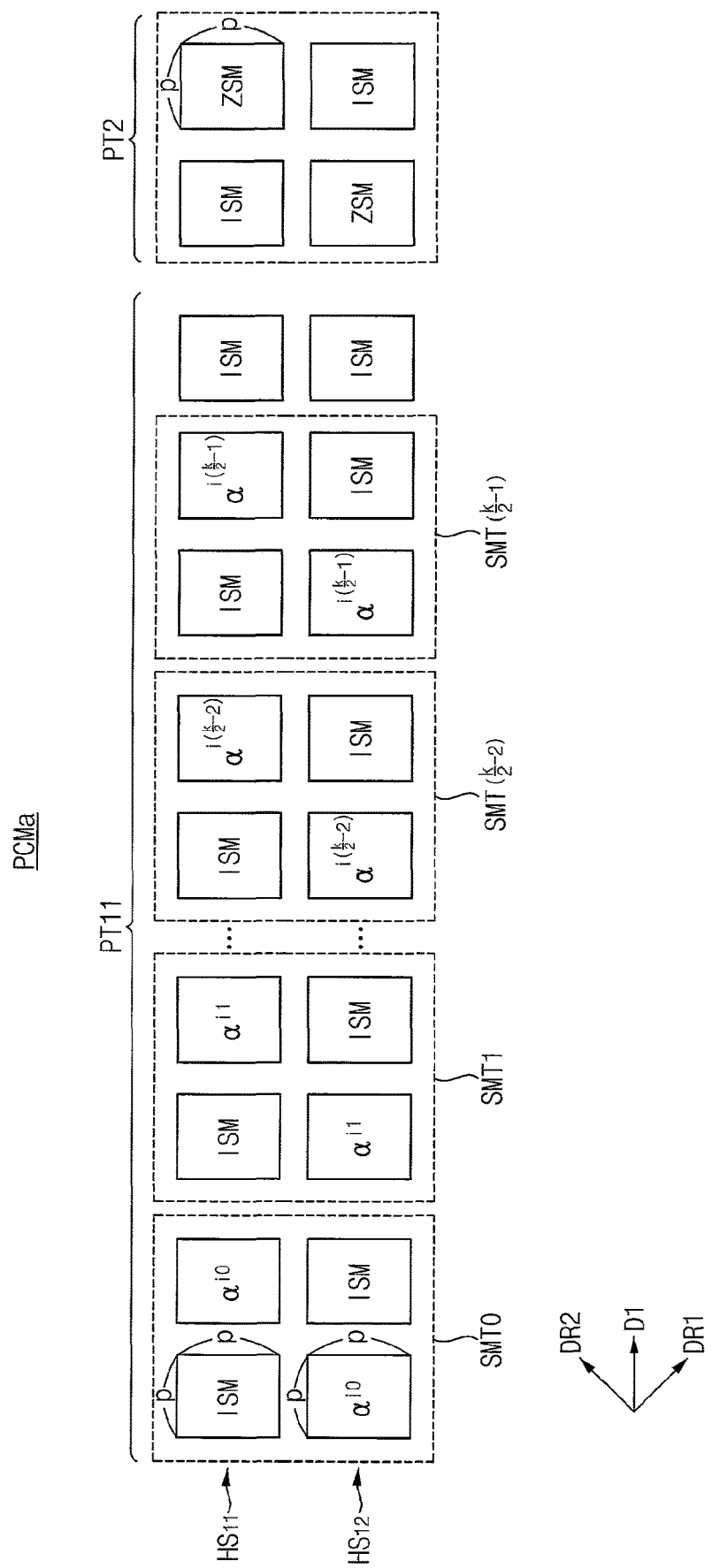
FIG. 11 illustrates another example of the parity check matrix stored in the memory in the ECC engine of FIG. 9A.

FIG. 11 illustrates another example of the parity check matrix stored in the memory in the ECC engine of FIG. 9A.

FIG. 11 illustrates an example of a parity check matrix PCMa when k is an odd natural number.

Referring to FIG. 11, the parity check matrix PCMa may include a first part PT11 and a second part PT12.

The first part PT11 may further include two identity sub matrixes ISMs corresponding to an additional symbol when compared with the first part PT1 in FIG. 10. The addition symbol may be associated with a meta data. The second part PT12 may be the same as the second part PT2 in FIG. 10.

FIG. 12 illustrates an identity sub matrix and a zero sub matrix in the parity generation matrix in FIG. 10.

In FIG. 12, it is assumed that p is 8.

Referring to FIG. 12, an identity sub matrix ISM1 includes p high level elements disposed in a diagonal direction and zero-value remaining elements from among p×p elements. In addition, a zero sub matrix ZSM1 includes p×p elements and each of p×p elements has a zero value.

FIG. 13 illustrates one of the alpha matrixes in the parity generation matrix in FIG. 10.

In FIG. 13, it is assumed that p is 8 and an alpha matrix $\alpha^{i(k/2-1)}$ is illustrated from among alpha matrixes $\alpha^{i0}, \alpha^{i1}, \ldots, \alpha^{i(k/2-2)}$ and $\alpha^{i(k/2-1)}$.

Referring to FIG. 13, the alpha matrix $\alpha^{i(k/2-1)}$ may include 5 rows each of which has one high-level value element and 3 rows each of which has two high-level value elements.

FIG. 14 illustrates one of the sub matrixes in the parity generation matrix in FIG. 10.

In FIG. 14, it is assumed that p is 8 and the sub matrix SMT(k/2−1) is illustrated from among the sub matrixes SMT0, SMT1, SMT(k/2−2) and SMT(k/2−1).

Referring to FIG. 14, the sub matrix SMT(k/2−1) may include two identity sub matrixes ISM1s of FIG. 12 disposed in the first diagonal direction DR1 and two alpha matrixes $\alpha^{i(k/2-1)}$ of FIG. 13 disposed in the second diagonal direction DR2.

Therefore, a number of high-level value elements in a y-th row of the sub matrix SMT(k/2−1) is the same as a number of high-level value elements in a (y+p)-th row of the sub matrix SMT(k/2−1). Here, y corresponds to one of 1 through 8.

For example, a number of high-level value elements in a first row 511 of the sub matrix SMT(k/2−1) is '2', which is the same as a number of high-level value elements in a ninth row 513 of the sub matrix SMT(k/2−1). A number of high-level value elements in a second row of the sub matrix SMT(k/2−1) is '3', which is the same as a number of high-level value elements in a tenth row of the sub matrix SMT(k/2−1). A number of high-level value elements in a third row of the sub matrix SMT(k/2−1) is '3', which is the same as a number of high-level value elements in a eleventh row of the sub matrix SMT(k/2−1). A number of high-level value elements in a fourth row of the sub matrix SMT(k/2−1) is '2', which is the same as a number of high-level value elements in a twelfth row of the sub matrix SMT(k/2−1).

A number of high-level value elements in a fifth row of the sub matrix SMT(k/2−1) is '2', which is the same as a number of high-level value elements in a thirteenth row of the sub matrix SMT(k/2−1). A number of high-level value elements in a sixth row of the sub matrix SMT(k/2−1) is '2', which is the same as a number of high-level value elements in a fourteenth row of the sub matrix SMT(k/2−1). A number of high-level value elements in a seventh row of the sub matrix SMT(k/2−1) is '2', which is the same as a number of high-level value elements in a fifteenth row of the sub matrix SMT(k/2−1). A number of high-level value elements in an eighth row of the sub matrix SMT(k/2−1) is '3', which is the same as a number of high-level value elements in a sixteenth row of the sub matrix SMT(k/2−1).

For example, assuming that two symbols corresponding to the sub matrix SMT(k/2−1) includes data bits d[15]~d[00], a syndrome corresponding to the sub matrix SMT(k/2−1) includes syndrome bits SB[00]~SB[15] and the parity data PRT includes syndrome bits PB[00]~PB[15].

The syndrome bit SB[00] may be represented by d[15]×d[00]×PB[00] and the syndrome bit SB[08] may be represented by d[08]×d[07]×PB[08].

The syndrome bit SB[01] may be represented by d[14]×d[07]×d[00]33 PB[01] and the syndrome bit SB[09] may be represented by d[15]×d[08]×d[06] PB[09].

The syndrome bit SB[07] may be represented by d[08]×d[01]×d[00] PB[07] and the syndrome bit SB[15] may be represented by d[09]×d[08]×d[00] PB[15].

Because a number of multiplication operations for generating two syndrome bits having p index difference are the same with respect to each other, a number of exclusive OR gates for generating two syndrome bits having p index difference are the same with respect to each other.

FIG. 15 illustrates an identity sub matrix and a zero sub matrix in the parity generation matrix in FIG. 10.

In FIG. 15, it is assumed that p is 16.

Referring to FIG. 16, an identity sub matrix ISM2 includes p high level elements disposed in a diagonal direction and zero-value remaining elements from among p×p elements.

FIG. 16 illustrates one of alpha matrixes in the parity generation matrix in FIG. 10.

In FIG. 16, it is assumed that p is 16 and an alpha matrix $\alpha^{i(k/2-1)'}$ is illustrated.

Referring to FIG. 16, the alpha matrix $\alpha^{i(k/2-1)'}$ may include 13 rows each of which has one high-level value element and 3 rows each of which has two high-level value elements.

Figures 17, 18:
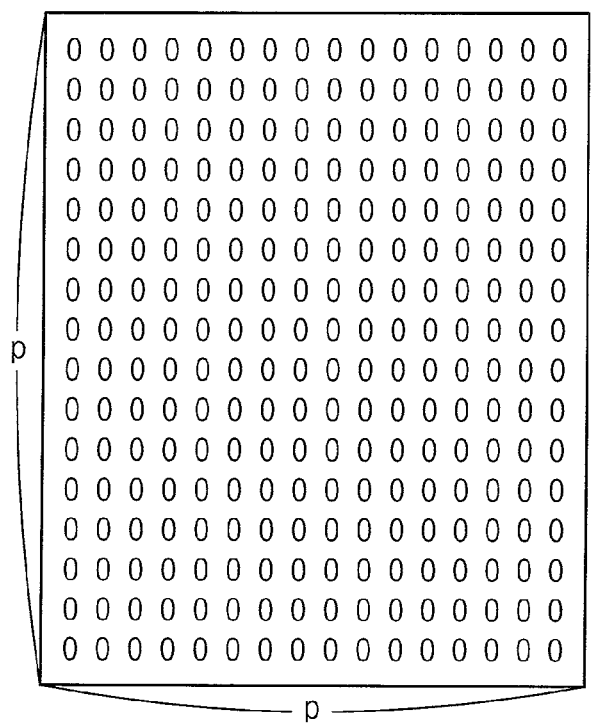
FIG. 17 illustrates a zero sub matrix and a zero sub matrix in the parity generation matrix in FIG. 10.
FIG. 18 illustrates that the syndrome generator generates the syndrome in the ECC engine of FIG. 9 according to example embodiments.

FIG. 17 illustrates a zero sub matrix and a zero sub matrix in the parity generation matrix in FIG. 10.

In FIG. 17, it is assumed that p is 16.

Referring to FIG. 17, a zero sub matrix ZSM2 includes p×p elements and each of p×p elements has a zero value.

FIG. 18 illustrates that the syndrome generator generates the syndrome in the ECC engine of FIG. 9 according to example embodiments.

Referring to FIG. 18, the syndrome generator 420 may generate the syndrome SDR by performing a matrix multiplication of vector representation H of the parity check matrix and a transpose matrix $C^T$ of a vector representation C of the read codeword RCW.

The vector representation C of the read codeword RCW may include first through k-th symbols SBL0~SBL(k−1) and the parity data PRT.

FIG. 19 illustrates one of the sub matrixes in the parity generation matrix in FIG. 10.

In FIG. 19, it is assumed that p is 16 and the sub matrix SMT(k/2−1)' is illustrated.

Referring to FIG. 19, the sub matrix SMT(k/2−1)' may include two identity sub matrixes ISM2 of FIG. 15 disposed in the first diagonal direction DR1 and two alpha matrixes $\alpha^{i(k/2-1)}$ of FIG. 16 disposed in the second diagonal direction DR2.

Therefore, a number of high-level value elements in a y-th row of the sub matrix SMT(k/2−1)' is the same as a number of high-level value elements in a (y+p)-th row of the sub matrix SMT(k/2−1)'. Here, y corresponds to one of 1 through 16.

For example, a number of high-level value elements in a first row 521 of the sub matrix SMT(k/2−1)' is '2', which is the same as a number of high-level value elements in a seventeenth row 523 of the sub matrix SMT(k/2−1)'. A number of high-level value elements in a second row of the sub matrix SMT(k/2−1)' is '2', which is the same as a number of high-level value elements in an eighteenth row of the sub matrix SMT(k/2−1). A number of high-level value elements in a third row of the sub matrix SMT(k/2−1) is '2', which is the same as a number of high-level value elements in a nineteenth row of the sub matrix SMT(k/2−1).

Because a number of high-level value elements in a y-th row of the sub matrix SMT(k/2−1)' is the same as a number of high-level value elements in a (y+p)-th row of the sub matrix SMT(k/2−1)', a number of high-level value elements in a y-th row of the parity check matrix PCM using the sub matrix SMT(k/2−1)' is the same as a number of high-level value elements in a (y+p)-th row of the parity check matrix PCM. Therefore, the ECC engine 400a may reduce calculation skew for generating a syndrome bit in the syndrome SDR corresponding to the y-th row and a syndrome bit in the syndrome SDR corresponding to the (y+p)-th row and may reduce delay generated associated with calculating a syndrome.

Figure 20:
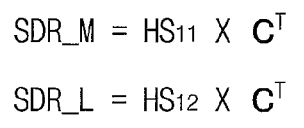

FIG. 20 illustrates that the ECC engine of FIG. 9 generates the error magnitude syndrome and the error locator syndrome based on the parity check matrix.

Referring to FIG. 20, the error magnitude syndrome SDR_M may be obtained by matrix multiplication of the first sub check matrix $HS_{11}$ of the parity check matrix of FIG. 10 and a transpose matrix $C^T$ of a vector representation C of the read codeword RCW. In addition, the error locator syndrome SDR_L may be obtained by matrix multiplication of the second sub check matrix $HS_{12}$ of the parity check matrix of FIG. 10 and the transpose matrix $C^T$ of the vector representation C of the read codeword RCW.

As described with reference to FIG. 10, because the first sub check matrix $HS_{11}$ may include a plurality of identity sub matrixes and the alpha matrixes $\alpha^{i0}, \alpha^{i1}, \ldots, \alpha^{i(k/2-2)}$ and $\alpha^{i(k/2-1)}$ which are alternatingly disposed in the first direction D1 and the second sub check matrix $HS_{12}$ may include a plurality of identity sub matrixes ISMs and the alpha matrixes $\alpha^{i0}, \alpha^{i1}, \ldots, \alpha^{i(k/2-2)}$ and $\alpha^{i(k/2-1)}$ which are alternatingly disposed in the first direction D1 in a reverse alternating order with respect to the first sub check matrix $HS_{11}$, the error magnitude syndrome SDR_M may have different values based on a number of errors in the read codeword RCW and the error locator syndrome SDR_L may represent a position of a symbol including errors in the read codeword RCW.

FIG. 21 illustrates an example of the syndrome according to example embodiments.

In FIG. 21, it is assumed that the read codeword RCW input to the ECC engine 400a in FIG. 9 includes a plurality of symbols, each of the symbols includes 16 bits and one of the symbols includes an error. Each symbol, not including an error, in the read codeword RCW corresponds to '0000000000000000' and the symbol, including an error, in the read codeword RCW corresponds to '0000000000000001'.

Referring to FIG. 21, the syndrome SDR includes the error magnitude syndrome SDR_M and the error locator syndrome SDR_L, the error magnitude syndrome SDR_M is represented by '0000000000000001' associated with an error in one symbol and the error locator syndrome SDR_L is represented by '1001000100100000' indicating a position of the symbol including the error.

Figure 22:
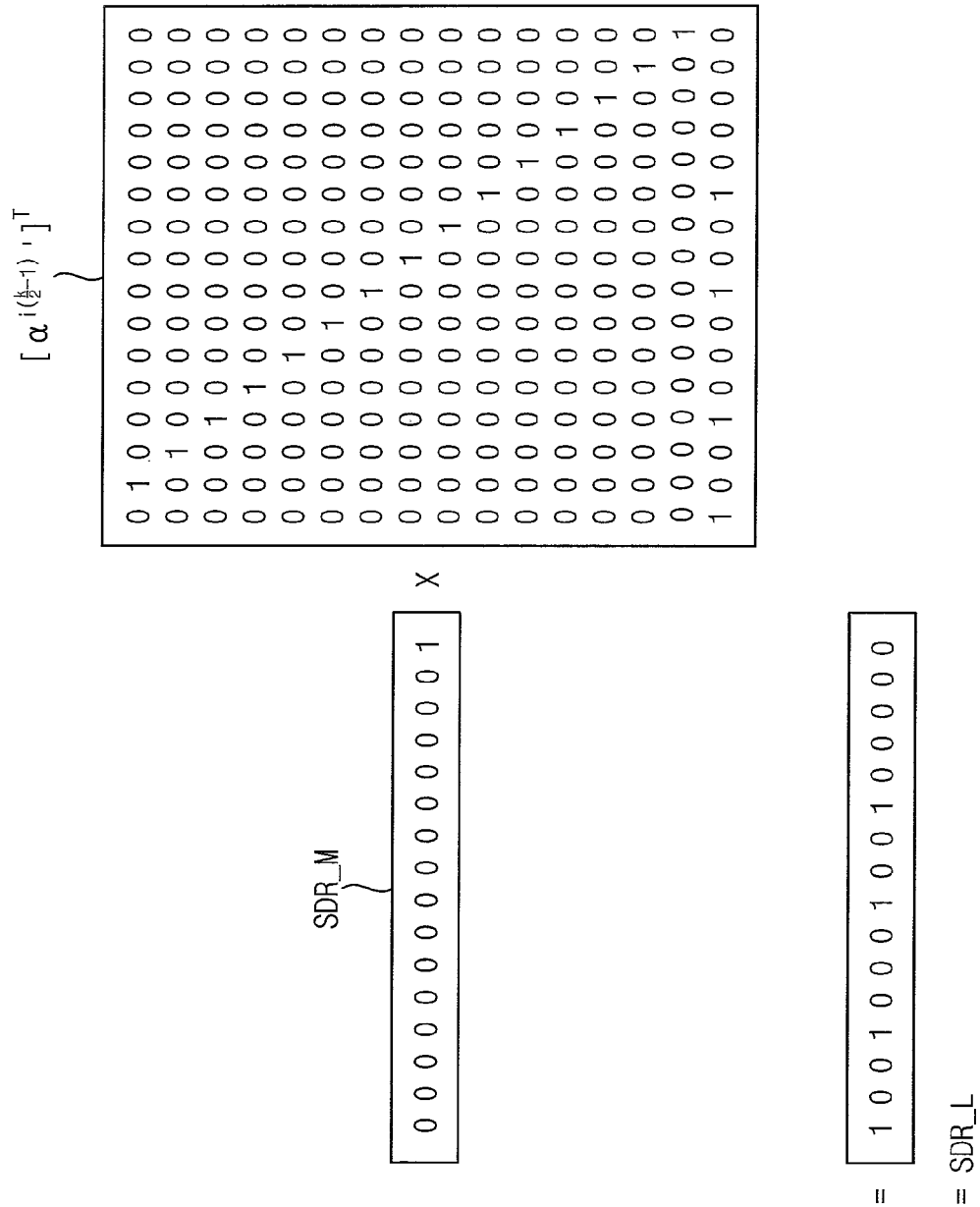
FIG. 22 illustrates that a result of multiplication of the error magnitude syndrome and an alpha matrix corresponding to a symbol including the error.

FIG. 22 illustrates that a result of multiplication of the error magnitude syndrome and an alpha matrix corresponding to a symbol including the error.

Referring to FIG. 22, result of multiplication of the error magnitude syndrome SDR_M and a transpose matrix $(\alpha^{i(k/2-1)'})^T$ of an alpha matrix $\alpha^{i(k/2-1)'}$ corresponding to the symbol including the error is the same as the error locator syndrome SDR_L.

That is, it is noted that an error occurs in a symbol corresponding to the alpha matrix $\alpha^{i(k/2-1)'}$.

Figure 23:
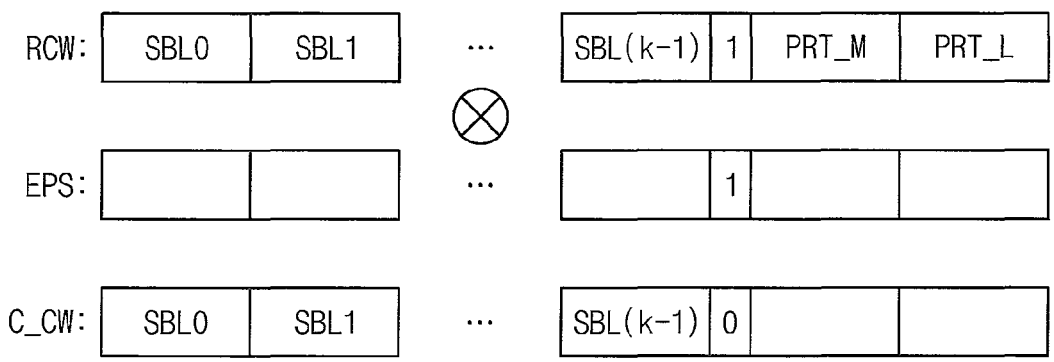
FIG. 23 illustrates that the ECC engine in FIG. 9 performs an RS decoding.

FIG. 23 illustrates that the ECC engine in FIG. 9 performs an RS decoding.

Referring to FIGS. 9 and 23, in the decoding operation, the syndrome SDR from the target page is provided to the ECC engine 400a.

The error locator syndrome generator 430 may generate the comparative error locator syndrome C_SDR_L by multiplying the error magnitude syndrome SDR_M in the syndrome SDR by an alpha matrix corresponding to the error in the syndrome SDR. The comparator 450 may output the comparison signal CS by comparing the error locator syndrome SDR_L with the comparative test error locator syndrome C_SDR_L. The comparison signal CS may indicate whether the error locator syndrome T_SDR_L matches (is the same as) the comparative error locator syndrome C_SDR_L.

The DSF generator 460 may generate the decoding status flag DSF indicating error status of the syndrome SDR based on the comparison signal CS. The error position generator 470 may generate the error position signal EPS indicating a position of the error in the read codeword RCW based on the comparison signal CS.

The data corrector 490 may correct the error in a symbol SBL(k-1) by performing an exclusive OR operation on the error position signal EPS and the read codeword RCW to output a corrected codeword C_CW.

In FIG. 23, it is assumed that the read codeword RCW includes a plurality of symbols SBL0~SBL(k-1), an error magnitude parity PRT_M and an error locator parity PRT_L, and a symbol SBL(k-1) of the plurality of symbols SBL0~SBL(k-1) includes an error. The symbol SBL(k-1) may be represented as '0000000000000001' and each of other symbols of the plurality of symbols SBL0~SBL(k-1) except the symbol SBL(k-1) may be represented as '0000000000000000'. Therefore, the error position generator 470 may generate the error position signal EPS indicating a position of the error in the symbol SBL(k-1).

The data corrector 490 may perform an exclusive OR operation on the error position signal EPS and the read codeword RCW to output a corrected codeword C_CW.

In response to the symbol SBL(k-1) including an error, the data corrector 490 may correct the error in the symbol SBL(k-1) by performing an exclusive OR operation on the error position signal EPS and the read codeword RCW to output a corrected codeword C_CW. The data corrector 490 may correct errors corresponding to a number of data bits in one symbol.

Figure 24:
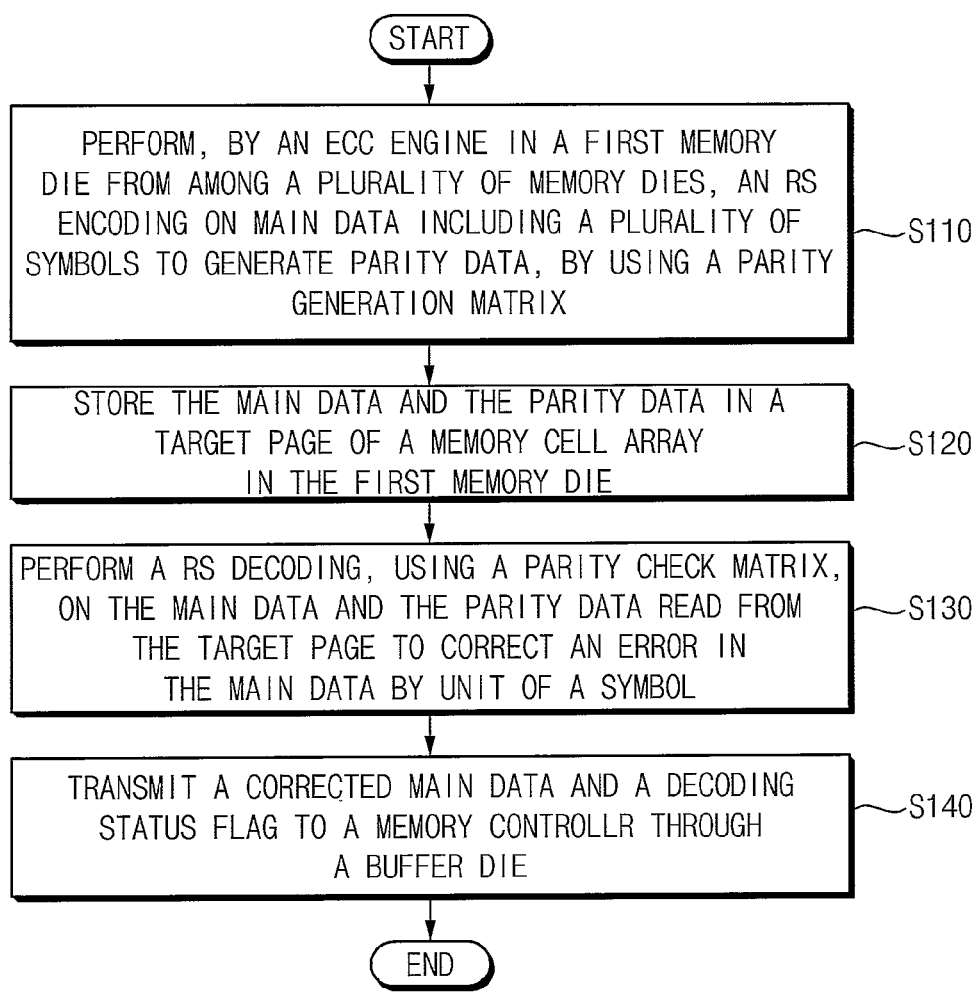
FIG. 24 is a flow chart illustrating a method of operating a semiconductor memory device according to example embodiments.

FIG. 24 is a flow chart illustrating a method of operating a semiconductor memory device according to example embodiments.

Referring to FIGS. 5 through 24, there is provided a method of operating a semiconductor memory device 70 which includes a buffer die 100 and a plurality of memory dies 200a~200r stacked on the buffer die 100. The memory dies 200a~200r are electrically connected to the buffer die 100 through TSVs 120. Each of the memory dies 200a~200d includes a memory cell array, a control logic circuit and an ECC engine.

According to the method, an ECC engine 400a in a first memory die of the plurality of memory dies 200a~200r, performs an RS encoding on a main data including a plurality of symbols to generate a parity data (operation S110).

The ECC engine 400a stores the main data and the parity data in a target page of the first memory die (operation S120).

The ECC engine 400a performs an RS decoding, using the parity check matrix PCM, on the main data and the parity data read from the target page to correct an error in the main data by unit of a symbol (operation S130).

The first memory die transmits a corrected main data and a decoding status flag indicating an error status to an external device (i.e., a memory controller) through the buffer die (operation S140).

The parity check matrix PCM may include a first part PT1 and a second part PT2. The first part PT1 may include a plurality of sub matrixes SMT0, SMT1, . . . , SMT(k/2-2) and SMT(k/2-1), and each of the plurality of sub matrixes SMT0, SMT1, . . . , SMT(k/2-2) and SMT(k/2-1) may correspond to two different symbols of a plurality of symbols in the main data MD. The first part PT2 may be associated with the parity data.

Each of the plurality of sub matrixes SMT0, SMT1, . . . , SMT(k/2-2) and SMT(k/2-1) may include two identity sub matrixes ISMs disposed in a first diagonal direction of the sub matrix and two same alpha matrixes, corresponding respective one of alpha matrixes $\alpha^{i0}$, $\alpha^{i1}$, . . . , $\alpha^{i(k/2-2)}$ and $\alpha^{i(k/2-1)}$, disposed in a second diagonal direction crossing the first diagonal direction of the sub matrix.

Each of the identity sub matrix and the alpha matrix may include p×p elements and p represents a number of data bits in each of the symbols. A number of high-level value elements in a y-th row of the parity check matrix PCM is the same as a number of high-level value elements in a (y+p)-th row of the parity check matrix PCM.

Therefore, in the semiconductor memory device and a method of operating the semiconductor memory device, the parity check matrix may be configured such that each of plurality of sub matrixes may include two identity sub matrixes and two same alpha matrixes, the two identity sub matrixes may be disposed in a first diagonal direction of the sub matrix and the two same alpha matrixes may be disposed in a second diagonal direction crossing the first diagonal direction of the sub matrix. A number of high-level value elements in a y-th row of the parity check matrix is the same as a number of high-level value elements in a (y+p)-th row of the parity check matrix. Therefore, the ECC engine 400 may reduce delay generated associated with calculating a syndrome and a parity data, because a configuration of the parity check matrix is simplified.

Figure 25:
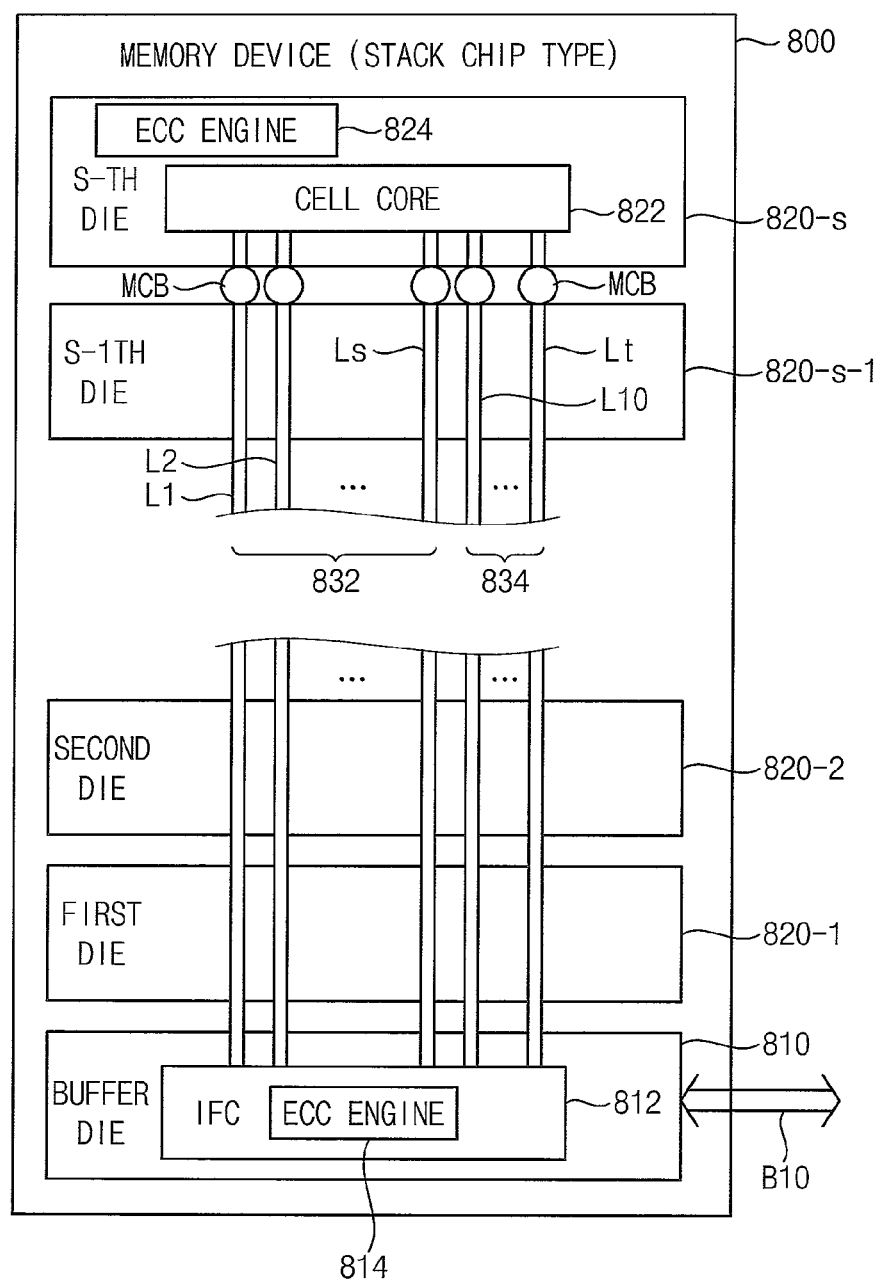
FIG. 25 is a block diagram illustrating a semiconductor memory device according to example embodiments.

FIG. 25 is a block diagram illustrating a semiconductor memory device according to example embodiments.

Referring to FIG. 25, a semiconductor memory device 800 may include at least one buffer die 810 and plurality of memory dies 820-1 to 820-*s* (s is an integer greater than two) which is stacked on the at least one buffer die 810 providing a stacked chip structure.

The plurality of memory dies 820-1 to 820-*s* are stacked on the at least one buffer die 810 and convey data through a plurality of through substrate via (or, through silicon via (TSV)) lines.

Each of the memory dies 820-1 to 820-*s* may include a cell core 822 to store data and parity and an ECC engine 824. The ECC engine 824 may employ the ECC engine 400*a* in FIG. 9 or other figures.

Therefore, the ECC engine 824 may perform a RS encoding on a data to be stored in the cell core 824 and may perform a RS decoding on a data read from the cell core 822 to correct an error in the read data by unit of a symbol using a parity check matrix. The parity check matrix may be configured such that each of plurality of sub matrixes may include two identity sub matrixes and two same alpha matrixes which are symmetric to each other in a diagonal direction. A number of high-level value elements in a y-th row of the parity check matrix is the same as a number of high-level value elements in a (y+p)-th row of the parity check matrix. Therefore, the ECC engine 824 may reduce delay generated associated with calculating a syndrome and a parity data, because a configuration of the parity check matrix is simplified.

The buffer die 810 may include an interface circuit 812 and the interface circuit 812 may include an ECC engine 814.

The ECC engine 814 may be referred to as a via ECC engine and may correct transmission error provided from at least one of the memory dies 820-1 to 820-*s*.

A data TSV line group 832 which is formed at one memory die 620-*s* may include a plurality of TSV lines L1 to Lt, and a parity TSV line group 834 may include a plurality of TSV lines L10 to Lt. The TSV lines L1 to Ls of the data TSV line group 832 and the parity TSV lines L10 to Lt of the parity TSV line group 834 may be connected to micro bumps MCB which are correspondingly formed among the memory dies 820-1 to 820-*s*.

The semiconductor memory device 800 may have a three-dimensional (3D) chip structure or a 2.5D chip structure to communicate with the host through a data bus B10. The buffer die 810 may be connected with the memory controller through the data bus B10.

Figure 26:
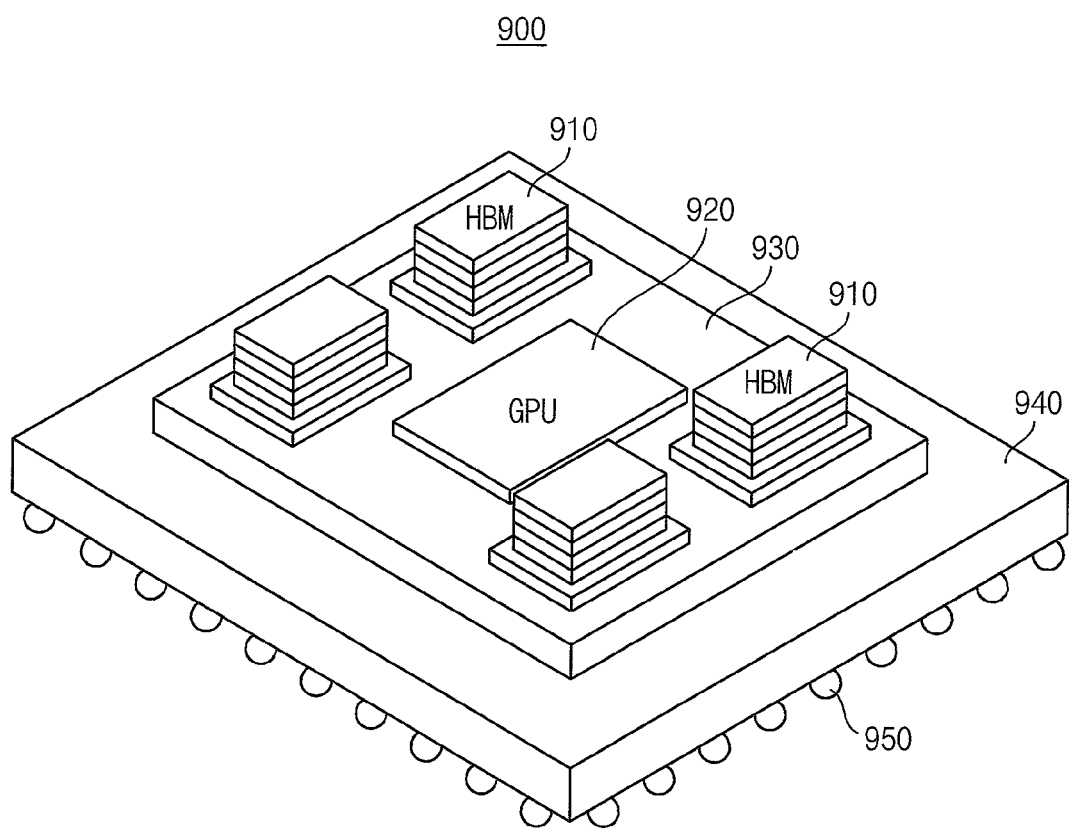
FIG. 26 is a diagram illustrating a semiconductor package including the stacked memory device according to example embodiments.

FIG. 26 is a diagram illustrating a semiconductor package including the stacked memory device according to example embodiments.

Referring to FIG. 26, a semiconductor package 900 may include one or more stacked memory devices 910 and a GPU 920.

The stacked memory devices 910 and the GPU 920 may be mounted on an interposer 930, and the interposer on which the stacked memory device 910 and the GPU 920 are mounted may be mounted on a package substrate 940.

The GPU 920 may perform the same operation as the memory controller 20 in FIG. 2 or may include the memory controller 20. The GPU 920 may store data, which is generated or used in graphics processing, in the stacked memory devices 910.

The stacked memory device 910 may be implemented in various forms, and the stacked memory device 910 may be a memory device in an high bandwidth memory (HBM) form in which a plurality of layers are stacked. Accordingly, the stacked memory device 910 may include a buffer die and a plurality of memory dies.

Each of the memory dies includes a memory cell array, a control logic circuit and an ECC engine.

Therefore, the ECC engine may perform an RS encoding on a data to be stored in the cell core 824 and may perform an RS decoding on a data read from the cell core 822 to correct an error in the read data by unit of a symbol using a parity check matrix.

The parity check matrix may be configured such that each of plurality of sub matrixes may include two identity sub matrixes and two same alpha matrixes which are symmetric to each other in a diagonal direction. A number of high-level value elements in a y-th row of the parity check matrix is the same as a number of high-level value elements in a (y+p)-th row of the parity check matrix. Therefore, the ECC engine 824 may reduce delay generated associated with calculating a syndrome and a parity data, because a configuration of the parity check matrix is simplified.

The control logic circuit may control the ECC engine.

The plurality of stacked memory devices 910 may be mounted on the interposer 930, and the GPU 920 may communicate with the plurality of stacked memory devices 910. For example, each of the stacked memory devices 910 and the GPU 920 may include a physical region, and communication may be performed between the stacked memory devices 910 and the GPU 920 through the physical regions.

Figure 27:
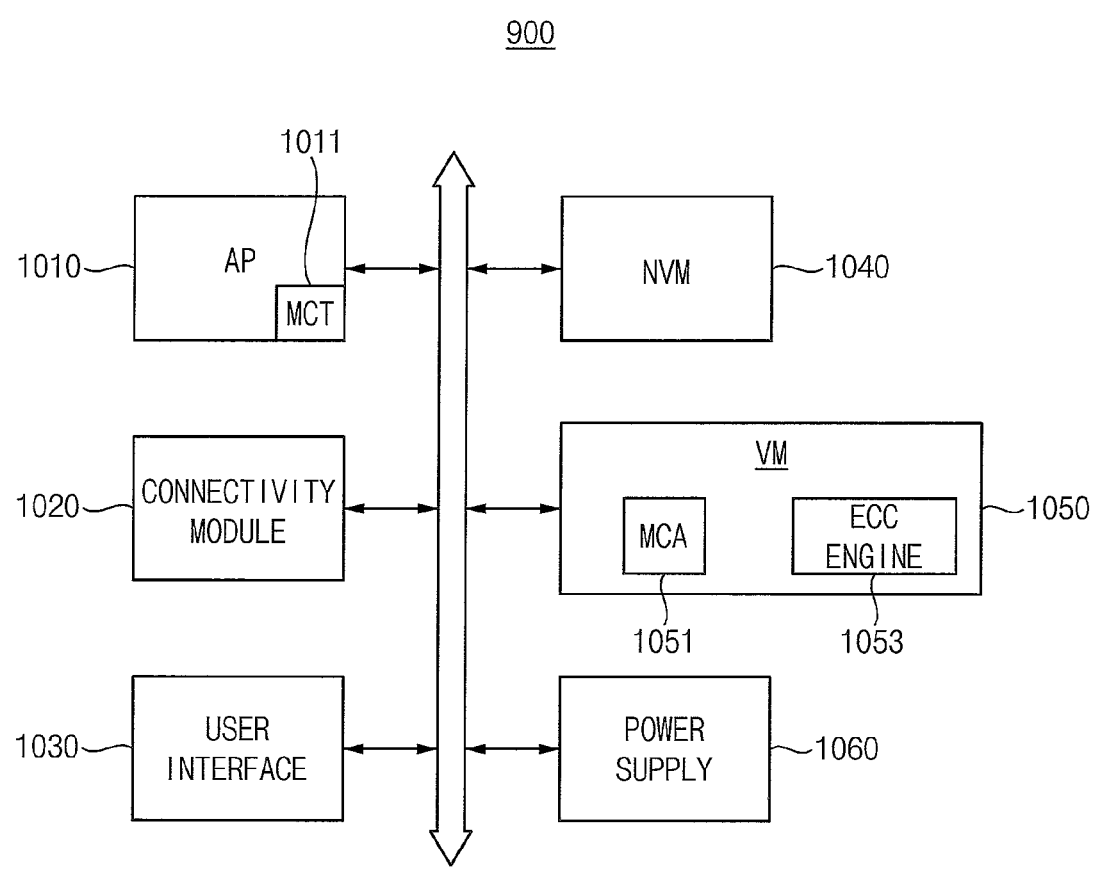
FIG. 27 is a block diagram illustrating a mobile system including a memory module according to example embodiments.

FIG. 27 is a block diagram illustrating a mobile system including a memory module according to example embodiments.

Referring to FIG. 27, a mobile system 1000 may include an application processor (AP) 1010, a connectivity module 1020, a volatile memory device (VM) 1050, a nonvolatile memory device 1040, a user interface 1030, and/or a power supply 1070.

The application processor 1010 may include a memory controller (MCT) 1011. The memory controller 1011 may employ the memory controller 20 in FIG. 2.

The application processor 1010 may execute applications, such as a web browser, a game application, a video player, etc. The connectivity module 1020 may perform wired and/or wireless communication with an external device.

The volatile memory device 1050 may store data processed by the application processor 1010 and/or operate as a working memory. The volatile memory device may have a configuration similar to the memory die 200*a* of FIG. 7 and may include a memory cell array 1051 and an ECC engine 1053. The ECC engine 1053 may employ the ECC engine 400*a* of FIG. 9A.

Therefore, the ECC engine 1053 may perform an RS encoding on data to be stored in the memory cell array 1051 and may perform an RS decoding on data read from the memory cell array 1051 to correct an error in the read data by unit of a symbol using a parity check matrix.

The parity check matrix may be configured such that each of a plurality of sub matrixes may include two identity sub matrixes and two same alpha matrixes which are symmetric to each other in a diagonal direction. A number of high-level value elements in a y-th row of the parity check matrix is the same as a number of high-level value elements in a (y+p)-th row of the parity check matrix. Therefore, the ECC engine 824 may reduce delay generated associated with calculating a syndrome and a parity data, because a configuration of the parity check matrix is simplified.

The nonvolatile memory device 1040 may store a boot image for booting the mobile system 1000.

The user interface 1030 may include at least one input device, such as a keypad, a touch screen, etc., and at least one output device, such as a speaker, a display device, etc.

The power supply 1070 may supply an operating voltage to the mobile system 1000.

The mobile system 1000 or components of the mobile system 1000 may be mounted using various types of packages.

Some example embodiments may be applied to various systems including a semiconductor memory device and a stacked memory device, a parity check matrix used in an ECC engine is configured such that each of a plurality of sub matrixes may include two identity sub matrixes and two same alpha matrixes which are symmetric and may reduce delay generated associated with calculating a syndrome and parity data.

Aspects of the present inventive concept may be applied to various systems that employ semiconductor memory devices and stacked memory devices and whether an ECC engine has a detect is determined based on various error patterns.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A semiconductor memory device comprising:
a buffer die configured to communicate with an external device; and
a plurality of memory dies stacked on the buffer die and configured to connect to the buffer die through a plurality of through substrate vias,
wherein each of the plurality of memory dies includes:
a memory cell array including a plurality of volatile memory cells coupled to a plurality of word-lines and a plurality of bit-lines; and
an error correction code (ECC) engine configured to perform a Reed-Solomon (RS) encoding, using a parity generation matrix, on main data to be stored in a target page of the memory cell array to generate parity data, and configured to perform an RS decoding, using a parity check matrix, on the main data and the parity data read from the target page to correct an error of the main data by unit of a symbol,
wherein the parity check matrix includes:
a first part including a plurality of sub matrixes, each of the plurality of sub matrixes corresponding to two different symbols of a plurality of symbols in the main data; and
a second part associated with the parity data,
wherein each of the plurality of sub matrixes includes two identity sub matrixes and two same alpha matrixes, the two identity sub matrixes disposed in a first diagonal direction of the sub matrix, the two same alpha matrixes disposed in a second diagonal direction crossing the first diagonal direction of the sub matrix,
wherein each identity sub matrix each alpha matrix includes p elements, p is a natural number greater than one and p corresponds to a number of data bits in each of the plurality of symbols, and
wherein a number of high-level value elements in a y-th row of the parity check matrix is the same as a number of high-level value elements in a (y+p)-th row of the parity check matrix and y is a natural number equal to or smaller than p.

2. The semiconductor memory device of claim 1, wherein:
each identity sub matrix includes p elements having a value of 1 in the first diagonal direction and remaining elements having a value of 0 except the p elements,
each alpha matrix belongs to elements of a Galois field, and
when a number of the plurality of symbols corresponds to k, which is an even natural number equal to or greater than two, a number of the alpha matrixes corresponds to k.

3. The semiconductor memory device of claim 2, wherein each alpha matrix is represented by $\alpha^i$ and i is equal to or greater than one and equal to or smaller than $2^p-1$.

4. The semiconductor memory device of claim 2, wherein:
the plurality of sub matrixes includes first through k/2 sub matrixes,
each of the first through k/2 sub matrixes includes two same matrixes of one of the first through k/2-th alpha matrixes, and
the first alpha matrix is represented by $\alpha^{i0}$ and the k/2-th alpha matrix is represented by $\alpha^{i(k/2-1)}$.

5. The semiconductor memory device of claim 2, wherein the ECC engine is configured to perform the RS encoding on the k symbols and the RS decoding on the k symbols using k/2 alpha matrixes.

6. The semiconductor memory device of claim 1, wherein the ECC engine includes:
a syndrome generator configured to:
in a write operation, perform the RS encoding, using the parity generation matrix, on the main data to generate the parity data, and
in a read operation, generate, using the parity check matrix, a syndrome including an error magnitude syndrome and an error locator syndrome based on a read codeword including the main data and the parity data read from the target page; and
an RS decoder configured to perform the RS decoding on the read codeword based on the syndrome,
wherein the error magnitude syndrome indicates a number of errors the read codeword, and
wherein the error locator syndrome indicates a position of a symbol including the error.

7. The semiconductor memory device of claim 6, wherein the RS decoder includes:
an error locator syndrome generator configured to generate a comparative error locator syndrome by multiplying the error magnitude syndrome by a corresponding alpha matrix;
a comparator configured to output a comparison signal by comparing the error locator syndrome with the comparative error locator syndrome;
an error position generator configured to generate an error position signal indicating a position of the error in the read codeword based on the comparison signal; and a data corrector configured to correct the error in the read codeword based on the error position signal to output a corrected codeword.

8. The semiconductor memory device of claim 7, wherein, when the error in the symbol is correctable, the error locator syndrome associated with the symbol is the same as the comparative error locator syndrome associated with the symbol.

9. The semiconductor memory device of claim 7, wherein, when the read codeword includes errors exceeding error correction capability of the ECC engine, an error locator syndrome associated with each of the plurality of symbols is different from a comparative error locator syndrome associated with each of the plurality of symbols.

10. The semiconductor memory device of claim 7, wherein the RS decoder further includes:
a decoding status flag generator configured to generate a decoding status flag indicating error status of the read codeword based on the syndrome and the comparison signal.

11. The semiconductor memory device of claim 6, wherein the syndrome generator is configured to generate the syndrome by performing a matrix multiplication on the read codeword and the parity check matrix.

12. The semiconductor memory device of claim 6, wherein the ECC engine further includes:
a multiplexer configured to output one of the main data and the read codeword to the syndrome generator based on a coding mode signal; and
a demultiplexer configured to provide an output of the syndrome generator to one of the target page and the RS decoder based on the coding mode signal.

13. The semiconductor memory device of claim 12, wherein the multiplexer, in response to the coding mode signal, is configured to:
select the main data in an encoding operation; and
select the read codeword in a decoding operation.

14. The semiconductor memory device of claim 12, wherein the demultiplexer, in response to the coding mode signal, is configured to:
provide the output of the syndrome generator to the target page as the parity data in an encoding operation; and
provide the output of the syndrome generator to the RS decoder as the syndrome in a decoding operation.

15. The semiconductor memory device of claim 1, wherein the parity generation matrix corresponds to the first part of the parity check matrix.

16. The semiconductor memory device of claim 1, wherein, in response to a number of the plurality of symbols corresponding to an odd natural number, the first part further includes two identity sub matrixes.

17. The semiconductor memory device of claim 1,
wherein the semiconductor memory device comprises a high bandwidth memory (HBM) 3, and
wherein the buffer die includes a via ECC engine configured to correct transmission errors in data transmitted from at least one of the plurality of memory dies, based on the RS decoding.

18. A semiconductor memory device comprising:
a memory cell array including a plurality of volatile memory cells coupled to a plurality of word-lines and a plurality of bit-lines;
an error correction code (ECC) engine configured to perform a Reed-Solomon (RS) encoding, using a parity generation matrix, on main data to be stored in a target page of the memory cell array to generate parity data, and configured to perform a RS decoding, using a parity check matrix, on the main data and the parity data read from the target page to correct an error of the main data by unit of a symbol; and
a control logic circuit configured to control the ECC engine based on a command and an address received from an external device,
wherein the parity check matrix includes:
a first part including a plurality of sub matrixes, each of the plurality of sub matrixes corresponding to two different symbols of a plurality of symbols in the main data; and
a second part associated with the parity data,
wherein each of the plurality of sub matrixes includes two identity sub matrixes and two same alpha matrixes, the two identity sub matrixes disposed in a first diagonal direction of the sub matrix, the two same alpha matrixes disposed in a second diagonal direction crossing the first diagonal direction of the sub matrix,
wherein each identity sub matrix and each alpha matrix includes p elements, p is a natural number greater than one and p corresponds to a number of data bits in each of the plurality of symbols, and
wherein a number of high-level value elements in y-th row of the parity check matrix is the same as a number of high-level value elements in (y+p)-th row of the parity check matrix and y is a natural number equal to or smaller than p.

19. The semiconductor memory device of claim 18, wherein:
each identity sub matrix includes p elements having a value of 1 in the first diagonal direction and remaining elements having a value of 0 except the p elements,
each alpha matrix belongs to a Galois field, and
when a number of the plurality of symbols corresponds to k, which is an even natural number equal to or greater than two, a number of the alpha matrixes corresponds to k.

20. A method of operating a semiconductor memory device, wherein the semiconductor memory device includes a buffer die configured to communicate with an external device and a plurality of memory dies stacked on the buffer die and configured to connect to the buffer die through a plurality of through substrate vias, the method comprising:
performing, by an error correction code (ECC) engine, in a first memory die of the plurality of memory dies, a Reed-Solomon (RS) encoding, using a parity generation matrix, on main data to generate parity data;
storing the main data and the parity data in a target page of a memory cell array of the first memory die; and
performing, by the ECC engine, a RS decoding, using a parity check matrix, on the main data and the parity data read from the target page, to correct an error of the main data by unit of a symbol,
wherein the parity check matrix includes:
a first part including a plurality of sub matrixes, each of the plurality of sub matrixes corresponding to two different symbols of a plurality of symbols in the main data; and
a second part associated with the parity data,
wherein each of the plurality of sub matrixes includes two identity sub matrixes and two same alpha matrixes, the two identity sub matrixes disposed in a first diagonal direction of the sub matrix, the two same alpha matrixes disposed in a second diagonal direction crossing the first diagonal direction of the sub matrix,
wherein each identity sub matrix and each alpha matrix includes p elements, p is a natural number greater than one and p corresponds to a number of data bits in each of the plurality of symbols, and wherein a number of high-level value elements in a y-th row of the parity check matrix is the same as a number of high-level value elements in a (y+p)-th row of the parity check matrix and y is a natural number equal to or smaller than p.

* * * * *